United States Patent [19]
Watanabe

[11] Patent Number: 5,387,031
[45] Date of Patent: Feb. 7, 1995

[54] ANTI-LOCK/TRACTION CONTROL BRAKE SYSTEM WHEREIN WHEEL BRAKE PRESSURE IS CONTROLLED BASED ON WHEEL SPEEDS RELATIVE TO VEHICLE SPEED

[75] Inventor: Masao Watanabe, Nagoya, Japan

[73] Assignee: Toyota Jidosha Kabushiki Kaisha, Aichi, Japan

[21] Appl. No.: 208,591

[22] Filed: Mar. 11, 1994

[30] Foreign Application Priority Data

Mar. 31, 1993 [JP] Japan .................. 5-098926

[51] Int. Cl.⁶ ............... B60T 8/32; B60T 8/70
[52] U.S. Cl. ................... 303/109; 303/103; 303/106
[58] Field of Search ...... 303/100, 102, 103, 104, 105, 303/106, 107, 108–111, 93, 113.2, 113.3, 91, 92, 94–99, 100; 364/426.01, 426.02, 426.03; 180/197; 188/181 A, 181 C

[56] References Cited

U.S. PATENT DOCUMENTS 5,150,950   9/1992   Arikawa et al. .............. 188/181 C

FOREIGN PATENT DOCUMENTS 2-310161   12/1990   Japan .

Primary Examiner—Douglas C. Butler
Attorney, Agent, or Firm—Oliff & Berridge

[57] ABSTRACT

An apparatus for preventing excessive slipping of a wheel of a motor vehicle, including a pressure regulator for regulating a brake force for braking the wheel based on at least an amount of change of a rotating speed of the wheel, a device for obtaining the rotating speed of the wheel, a device for obtaining a running speed of the vehicle; and a device for obtaining, as a kind of the amount of change of the rotating speed of the wheel, a relative wheel speed change amount which corresponds to an amount of change of a difference between the speeds of the wheel and the vehicle.

29 Claims, 10 Drawing Sheets

ANTI-LOCK/TRACTION CONTROL BRAKE SYSTEM WHEREIN WHEEL BRAKE PRESSURE IS CONTROLLED BASED ON WHEEL SPEEDS RELATIVE TO VEHICLE SPEED

BACKGROUND OF THE INVENTION

1. Field of the Invention

The present invention relates in general to an apparatus for preventing excessive slipping of wheels of a motor vehicle upon acceleration or braking of the vehicle.

2. Discussion of the Related Art

A wheel of a motor vehicle will slip on a road surface to an excessive extent when a drive force transmitted to the wheel upon acceleration of the vehicle is excessive in relation to a force of friction between the wheel tire and the road surface, or when a brake force applied to the wheel upon braking of the vehicle is excessive in relation to the force of friction between the tire and the road surface. The acceleration or braking of the vehicle is effected in dependence on the force of friction between the wheel tire and the road surface. The force of friction is maximized when the ratio of slip of the wheel relative to the road surface (namely, the slip amount of the wheel divided by the vehicle speed) is optimum. Accordingly, the acceleration or braking of the vehicle need to be effected with the slip ratio or slip amount of the wheel maintained in an optimum range, so that the vehicle is accelerated or braked in a satisfactory fashion.

In view of the above need, a brake system of a motor vehicle known in the art is adapted to effect a traction control of a wheel drive force and/or an anti-lock control of a wheel brake force. In the wheel traction control, a brake force is applied to a driving wheel of the vehicle to reduce an effective drive force generated by the driving wheel, for thereby avoiding excessive slipping of the driving wheel upon acceleration of the vehicle. In the anti-lock control, the brake force applied to a wheel of the vehicle is reduced so as to avoid excessive slipping of the wheel upon braking of the vehicle.

The brake force applied to the vehicle wheel as described above is regulated in various manners. An example of such manners of regulating the brake force is disclosed in JP-A 2-310161. According to this publication the brake force is regulated on the basis of an amount of change in the rotating speed of the wheel, more specifically, on the basis of only the amount of change in the wheel speed, or on the basis of not only the wheel speed change amount but also another parameter such as the wheel speed per se or the vehicle speed. It is noted that an acceleration value of the wheel, which is the amount of change in the wheel speed per unit time, is considered to be a kind of the wheel speed change amount. In the present application, however, the amount of change in the wheel speed will not be referred to as "wheel acceleration", since the amount of change in the wheel speed is treated herein as a parameter which is not necessarily an amount of change per unit time but a parameter obtained within a given time duration.

The slip amount or ratio of the vehicle wheel is calculated from the vehicle speed and the wheel speed. An amount of increase or decrease in the wheel slip amount or ratio can be obtained from the amount of change in the wheel speed. Therefore, the slip amount or ratio of the wheel can be maintained within the optimum range when the brake force applied to the wheel is suitably controlled on the basis of either the wheel speed, vehicle speed and wheel speed change amount in combination, or the wheel speed change amount alone.

Conventionally, the wheel speed change amount is detected by a suitable wheel speed sensor as an amount of change in the actual wheel speed. However, the wheel speed change amount thus obtained includes not only an amount of change in the wheel speed which arises from the slipping of the wheel on the road surface, but also an amount of change in the actual vehicle speed. Although the wheel speed change amount which does not include the vehicle speed change amount accurately represents a change in the slip amount or ratio of the wheel, the conventional arrangement uses the wheel speed change amount including the vehicle speed change amount, for regulating the brake force applied to the wheel to control the wheel slip amount or ratio.

SUMMARY OF THE INVENTION

The present invention was developed in the light of the foregoing prior art background. It is therefore an object of the present invention to provide an apparatus for preventing excessive slipping of a wheel of a motor vehicle, which apparatus permits improved accuracy of control of the wheel slip amount or ratio, by utilizing a parameter which relates to the wheel speed change amount and which accurately represents the amount of increase or decrease in the wheel slip amount or ratio.

The above object may be achieved according to the principle of the present invention, which provides an apparatus for preventing excessive slipping of a wheel of a motor vehicle, including pressure regulating means for regulating a brake force for braking the wheel based on at least an amount of change of a rotating speed of the wheel, said apparatus being characterized by comprising: (a) wheel speed obtaining means for obtaining the rotating speed of the wheel; (b) vehicle speed obtaining means for obtaining a running speed of the vehicle; and (c) relative speed change obtaining means for obtaining, as a kind of the amount of change of the rotating speed of the wheel, a relative wheel speed change amount which corresponds to an amount of change of a difference between the speeds of the wheel and the vehicle obtained by the wheel speed obtaining means and the vehicle speed obtaining means, respectively.

In the present apparatus constructed according to the invention to prevent excessive slipping of a wheel of a motor vehicle, the relative speed change obtaining means obtains the relative wheel speed change amount as a parameter representing the amount of change of the wheel speed. The relative wheel speed change amount corresponds an amount of change of a difference between the wheel speed and the vehicle speed which are obtained by the wheel speed obtaining means and the vehicle speed obtaining means, respectively.

The pressure regulating means regulates the brake force for the wheel, on the basis of at least the relative wheel speed change amount obtained by the relative speed change obtaining means.

The relative wheel speed change amount does not include an amount of change of the vehicle speed, and therefore accurately represents or reflects the amount or ratio of slip of the wheel on the road surface. Since the present apparatus is arranged to regulate the brake force for the wheel based on this relative wheel speed change amount, the slip amount or slip ratio of the wheel can be maintained within a predetermined optimum range that assures excellent acceleration and/or braking of the vehicle.

It is desirable that at least one of the wheel speed obtaining means, vehicle speed obtaining means and relative speed change obtaining means incorporates or is integrally combined with suitable smoothing means for smoothing the corresponding parameter or parameters, that is, at least one of the wheel speed, vehicle speed and relative wheel speed change amount, so as to remove a noise from the parameter or parameters.

According to one preferred form of the present invention, the relative speed change obtaining means includes smoothing means for obtaining a smoothed relative wheel speed change amount by smoothing the relative wheel speed change amount. According to one arrangement of this form of the invention, the smoothing means comprises a digital filter for obtaining the smoothed relative wheel speed change amount by digital smoothing of the relative wheel speed change amount. For example, the digital filter may include a first digital filter for smoothing the relative wheel speed change amount to obtain a first relative wheel speed change amount as the smoothed relative wheel speed change amount, and also a second digital filter for smoothing the first relative wheel speed change amount to obtain a second relative wheel speed change amount as the smoothed relative wheel speed change amount.

According to another arrangement of the above preferred form of the invention, the smoothing means comprises a first digital filter for smoothing the relative wheel speed change amount to obtain a non-compressed first relative wheel speed change amount as the smoothed relative wheel speed change amount, and compressing means for compressing the non-compressed first relative wheel speed change amount to obtain a compressed first relative wheel speed change amount as the smoothed relative wheel speed change amount. The compressing means may include at least one of positive compressing means and negative compressing means. The positive compressing means is adapted to reduce an absolute value of the non-compressed first relative wheel speed change amount to obtain the compressed first relative wheel speed change amount when the non-compressed first relative wheel speed change amount is larger than a predetermined positive value. On the other hand, the negative compressing means is adapted to reduce the absolute value of the non-compressed first relative wheel speed change amount to obtain the compressed first relative wheel speed change amount when the non-compressed first relative wheel speed change amount is smaller than a predetermined first negative value. The present arrangement is effective to avoid a rapid change in the compressed first relative wheel speed change amount, which is not actually possible and which is considered to include a noise. Namely, the present arrangement is adapted to eliminate such noise from the non-compressed first relative wheel speed change amount when the compressed change amount is obtained by compression of the non-compressed change amount.

In one feature of the above arrangement, the compressing means comprises at least the negative compressing means, and the smoothing means further comprises means for disabling the negative compressing means when the non-compressed first relative wheel speed change amount is smaller than a predetermined second negative value smaller than the first negative value. This feature is effective to avoid a delayed decrease in the brake force upon commencement of braking of the vehicle on a road surface having a relatively low friction coefficient, or upon rapid lowering of the friction coefficient of the road surface.

In another feature of the same arrangement of the invention, the smoothing means further comprises a second digital filter for smoothing the compressed first relative wheel speed change amount obtained by the compressing means, to obtain a second relative wheel speed change amount as the smoothed relative wheel speed change amount. According to this feature of the invention, the first relative wheel speed change amount is first obtained from the smoothing the initially obtained or non-smoothed first relative wheel speed change amount, and a noise possibly included in the smoothed first relative wheel speed change amount is eliminated by the compressing means indicated above. Then, the compressed first relative wheel speed change amount is further smoothed to obtain the second relative wheel speed change amount, which is considered to accurately represent the actual amount of change of the relative speed of the wheel with respect to the running speed of the vehicle.

According to another arrangement of the preferred form of the invention indicated above, the smoothing means comprises at least one of the positive compressing means and negative compressing means which have been described above, but does not comprise the first digital filter indicated above.

In another preferred form of the invention, which is applicable to the vehicle having a plurality of wheels, the vehicle speed obtaining means comprises vehicle speed estimating means for obtaining an estimated vehicle speed on the basis of a highest wheel speed which is a highest one of the rotating speeds of the plurality of wheels.

According to one advantageous arrangement of the above form of the invention, the vehicle speed estimating means includes means for limiting at least one of an increasing rate and a decreasing rate of the highest wheel speed. This arrangement permits accurate estimation of the actual running speed of the vehicle, without a noise included in the estimated vehicle speed. That is, this arrangement is based on a concept that an extremely rapid change in the vehicle speed takes not actually take place, or the rate of change in the highest wheel speed does not normally exceed a certain limit.

According to another advantageous arrangement of the same form of the invention, the vehicle speed estimating means includes at least one of: first adjusting means for reducing the highest wheel speed with an increase in an external disturbance value which is common to all of the plurality of wheels; second adjusting means for increasing the highest wheel speed with a decrease in a friction coefficient of a road surface on which the vehicle is running; and third adjusting means for reducing the highest wheel speed with an increase in a degree of turning of the vehicle. According to one preferred feature of this arrangement, the vehicle speed estimating means includes smoothing means for smoothing the highest wheel speed as adjusted by at least one of the first, second and third adjusting means, to obtain the estimated vehicle speed. This feature of smoothing the highest wheel speed after its adjustment by the adjusting means indicated above is effective to minimize oscillatory regulation of the brake force due to an excessive amount of the prior adjustment of the highest wheel speed.

According to the above preferred feature wherein the highest wheel speed is smoothed, the smoothing means may include first integrating means for obtaining a first integral by integrating an error between the estimated vehicle speed and the highest wheel speed as adjusted by at least one of the first, second and third adjusting means, and second integrating means for obtaining a final estimated vehicle speed by integrating the first integral.

Where the above preferred feature of the invention is applied to the apparatus which comprises anti-lock control means for controlling the pressure regulating means to regulate the brake force for braking the wheel so as prevent excessive slipping of the wheel on a road surface upon braking of the vehicle, the vehicle speed estimating means preferably includes the above-indicated second adjusting means, and the smoothing means preferably comprises means for setting an amount of change of the estimated vehicle speed upon commencement of an operation of the anti-lock control means, to a value corresponding to a friction coefficient of the road surface which is high enough to avoid easy locking of the wheel on the road surface. This friction coefficient is preferably higher than 0.6, more preferably higher than 0.8, and most preferably almost 1.0. This arrangement assures adequate anti-lock regulation of the brake force for the wheel irrespective of whether the friction coefficient of the road surface is relatively high or low.

The smoothing means according to the above-indicated preferred feature of the invention may comprise means for smoothing the highest wheel speed to obtain the estimated vehicle speed such that the estimated vehicle is more responsive to the highest wheel speed when the friction coefficient of the road surface decreases, than when the friction coefficient increases. This arrangement is based on a fact that the braked wheel is more likely to be locked when the friction coefficient of the road surface is decreasing, than when the friction coefficient is increasing. Alternatively, the smoothing means may comprise response adjusting means for causing an easier change of the estimated vehicle speed in at least one of first and second cases where the friction coefficient of the road surface is higher and lower than respective upper and lower limits, respectively, than in cases other than the first and second cases. This arrangement assures fast and accurate estimation of the vehicle speed even when the friction coefficient of the road surface is extremely high or low.

The smoothing means may comprise response adjusting means for causing an easier change of the estimated vehicle speed in at least one of first and second cases where an error between the estimated vehicle speed and the highest wheel speed as adjusted by at least one of the first, second and third adjusting means is held positive and negative for more than a first and a second predetermined time, respectively, than in cases other than the first and second cases. In this respect, it is noted that the error or difference between the adjusted highest wheel speed and the estimated vehicle speed may be held positive or negative for a relatively long time if the amount of change of the estimated vehicle speed is held relatively small for some reason or other.

Where the motor vehicle has a plurality of wheels whose brake pressures are regulated by the pressure regulating means, and the digital filter of the smoothing means indicated above has the first and second digital filters as described above, the vehicle speed obtaining means may comprise vehicle speed estimating means for obtaining an estimated vehicle speed on the basis of a highest wheel speed which is a highest one of the rotating speed of the plurality of wheels, the vehicle speed estimating means including at least one of the first, second and third adjusting means described above.

In one arrangement of the above preferred arrangement, the vehicle speed estimating means comprises the first adjusting means which comprises common disturbance obtaining means for obtaining the external disturbance value on the basis of an absolute value of a smallest negative value of the second relative wheel speed change amounts of the wheels whose brake pressures are increasing. When the second relative wheel speed change amount is positive while the brake pressure for the wheel is increasing, this generally indicates that an increase of the brake pressure has just been commenced. The absolute value of the second relative wheel speed change amount during an initial period of the brake pressure increase usually accurately reflects the degree of the external disturbance such as waviness or bumpiness of the road surface and vibration of the wheel. In view of this fact, the largest one of the absolute values of the second relative wheel speed change amount of the wheels is used as a parameter representing the disturbance common to all the wheels. This arrangement minimizes an adverse influence of the external disturbance on the estimated vehicle speed.

The first adjusting means may further comprise means for disabling the common disturbance obtaining means for a predetermined time duration after commencement of operation of the pressure regulating means to regulate the brake pressures for the wheels. During a given period after commencement of operation of the pressure regulating means, the amount of change of the wheel speed is relatively large, and the common external disturbance value if obtained during this period usually includes a considerable amount of error with respect to the actual disturbance value. For this reason, the common disturbance obtaining means is disabled during the initial period of operation of the pressure regulating means. The common disturbance obtaining means may comprise means for limiting a decreasing rate of the disturbance value while the absolute value of the smallest negative value is decreasing. This arrangement permits a relatively high response of the obtained common external disturbance value to a deteriorating change of the road surface condition, and a relatively low response of the same to an improving change of the road surface condition.

The second adjusting means indicated above preferably comprises: pressure-difference generating means for generating a pressure difference between a first rear brake pressure for one of the rear right and left wheels whose rotating speed is higher than the other rear wheel, and a second rear brake pressure for the other rear wheel, such that the first rear brake pressure is lower than the second rear brake pressure; and means for increasing the highest wheel speed with an increase in a rear wheel speed difference between the rotating speeds of the rear right and left wheels. This arrangement assures accurate determination of the vehicle speed on the basis of the higher-speed rear wheel.

The third adjusting means indicated above may comprise means for reducing the highest wheel speed with an increase in a front wheel speed difference between the rotating speeds of the front right and left wheels. This arrangement is based on the fact that the speed difference of the front right and left wheels more accurately represents the degree of turning of the vehicle, than the speed difference of the rear right and left wheels. In this respect, it is noted that while the vehicle is turning, the load on the rear wheel on the inner side of the turning path of the vehicle is the smallest, whereby the inner rear wheel tends to slip on the road surface, and the rear wheel speed difference does not accurately represents the degree of turning of the vehicle, particularly when the pressure-difference generating means as indicated above is employed.

According to a further preferred form of the invention, the wheel speed obtaining means comprises: vehicle speed change calculating means for calculating an estimated vehicle speed change amount which is a difference between two values of the running speed of the vehicle; and means for calculating a present value of the rotating speed of the wheel, by adding the estimated vehicle speed change amount and the relative wheel speed change amount obtained by the relative speed change obtaining means, to a last value of the rotating speed of the wheel. In this case, the pressure regulating means may comprise: generating means for generating a reference speed of the wheel on the basis of the running speed of the vehicle obtained by the vehicle speed obtaining means; and commanding means for generating a control command for regulating the brake force, on the basis of a difference between the present value of the rotating speed of the wheel and the reference speed of the wheel.

The present apparatus as described is suitably applicable to an anti-lock brake system comprising anti-lock control means for controlling the pressure regulating means to regulate the brake force for braking the wheel so as prevent excessive slipping of the wheel on a road surface upon braking of the vehicle.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
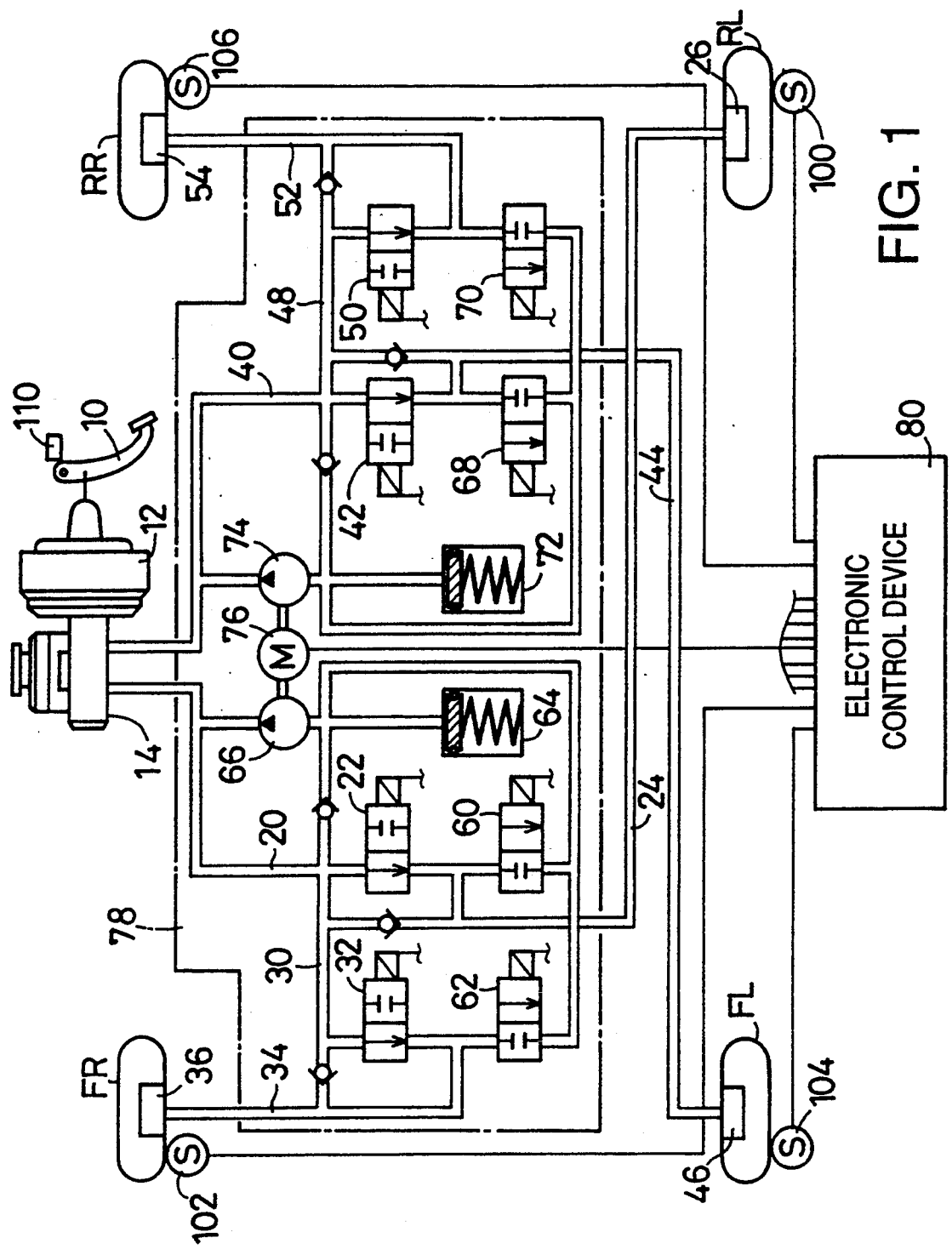
FIG. 1 is a schematic view showing an anti-lock hydraulic brake system of a motor vehicle embodying the present invention.

Referring first to FIG. 1, there is shown a hydraulically operated anti-lock brake system for a motor vehicle. In FIG. 1, reference numeral 10 denotes a brake pedal connected to a master cylinder 14 through a booster 12. The master cylinder 14 is of a tandem type having two pressure chambers arranged in series. With the brake pedal 10 depressed, equal hydraulic pressures are generated as brake pressures in the pressure chambers of the master cylinder 14.

In the present hydraulic brake system, the pressure chambers of the master cylinder 14 are connected to brakes for four wheels FR, FL, RR, RL through two mutually independent piping systems of so-called "X arrangement". In the first piping system, one of the pressure chambers of the master cylinder 14 is connected to the brake cylinder 26 for a brake of the rear left wheel RL through a fluid passage 20, a normally-open solenoid operated valve 22 and a fluid passage 24, and also to the brake cylinder 36 of a brake of the front right wheel FR through the fluid passage 20, a fluid passage 30, a normally-open solenoid-operated valve 32 and a fluid passage 34. In the second piping system, the other pressure chamber of the master cylinder 14 is connected to the brake cylinder 46 for a brake of the front left wheel FL through a fluid passage 40, a normally-open solenoid-operated valve 42 and a fluid passage 44, and also to the brake cylinder 54 for a brake of the rear right wheel RR, through the fluid passage 40, a fluid passage 48, a normally-open solenoid-operated valve 50 and a fluid passage 52.

In the first piping system, the fluid passage 24 is connected to a reservoir 64 through a normally-closed solenoid valve 60, while the fluid passage 34 is connected to a reservoir 64 through a normally-closed solenoid valve 62. The reservoir 64 is connected to a suction inlet of a pump 66, while an delivery outlet of the pump 66 is connected to the fluid passage 20.

In the second piping system, on the other hand, the fluid passages 44 and 52 are connected to a reservoir 72 through respective normally-closed solenoid valves 68 and 70. The reservoir 72 is connected to a suction inlet of a pump 74 while a delivery outlet of the pump 74 is connected to the fluid passage 40. The two pumps 66, 74 are driven by a common drive motor 76.

In the present brake system having the piping arrangement indicated above, therefore, the brake pressure for the rear left wheel RL, for example, is increased when the solenoid-operated valves 22, 60 are both placed in their non-energized state, kept at a constant level when only the solenoid-operated valve 22 is placed in the energized state, and decreased when the valves 22, 60 are both placed in the energized state. Similarly, the brake pressures for the other wheels FR, FL and RR are controlled. That is, an appropriate one of the pressure-increase, pressure-hold and pressure-decrease positions is selected by establishing the corresponding combination of the operating states of the appropriate two solenoid-operated valves (22, 60; 32, 62; 42, 68; 50, 70).

The solenoid-operated valves 22, 32, 42, 50, 60, 62, 68, 70, reservoirs 64, 72, pumps 66, 74 and motor 76 constitute a major part of an anti-lock brake system actuator (hereinafter referred to as "ABS actuator") 78 indicated by a block of one-dot chain line in FIG. 1.

In the present embodiment, the brake system is adapted for use on a front-engine front-drive vehicle (FF vehicle), in which the front wheels FR, FL are driving wheels while the rear wheels RR, RL are driven wheels.

Figure 2:
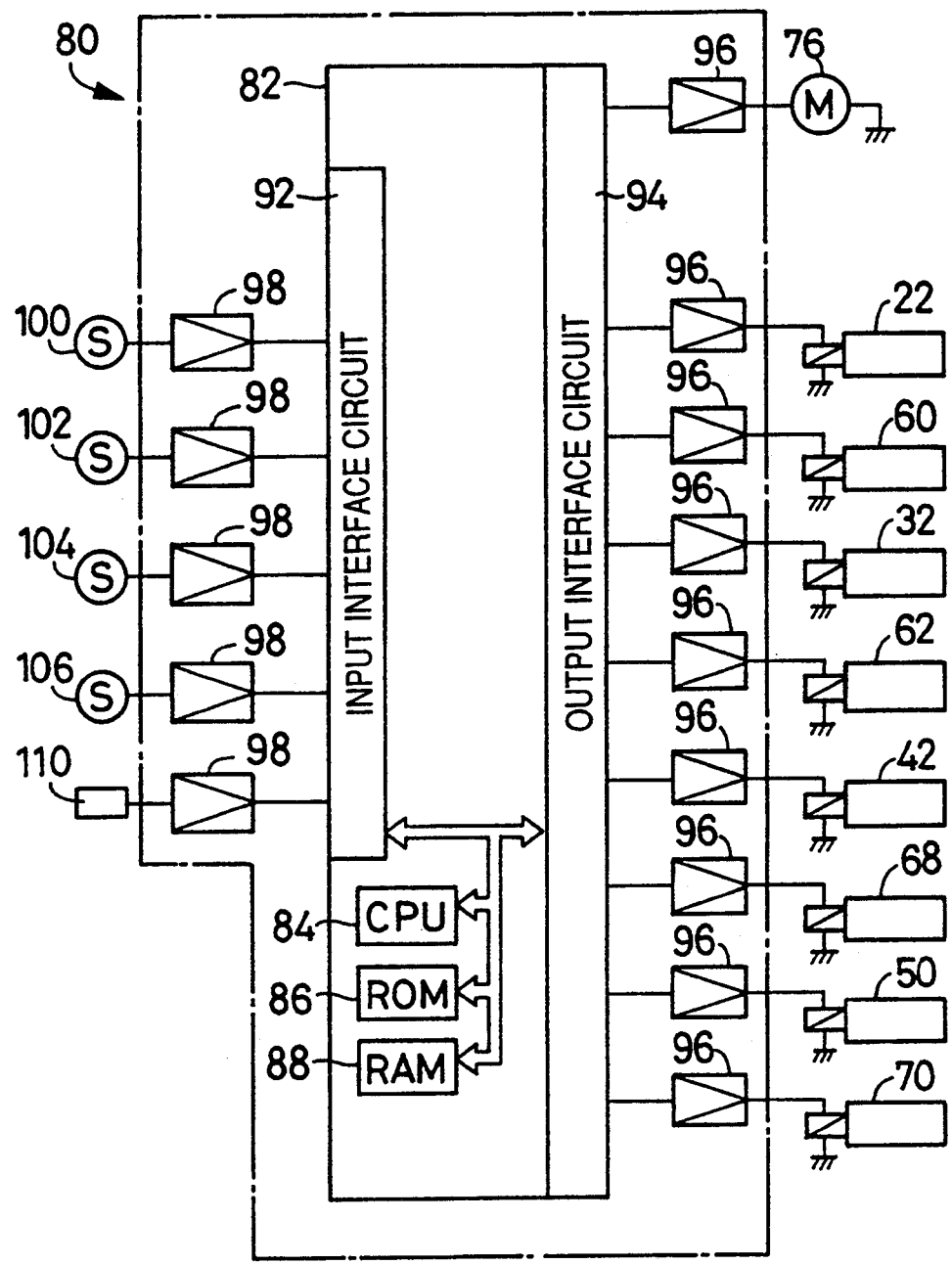
FIG. 2 is a schematic block diagram illustrating a hardware arrangement of an electronic control device for the brake system of FIG. 1.

The ABS actuator 78 is controlled by an electronic control device 80 whose major portion is constituted by a computer 82 incorporating a central processing unit (CPU) 84, a read-only memory (ROM) 86, a random-access memory (RAM) 88, an input interface circuit 92 and an output interface circuit 94, as indicated in FIG. 2. To the output interface circuit 94, there are connected the motor 76 and the solenoid-operated valves 22, 32, 42, 50, 60, 62, 68 and 70 through respective drivers 96. To the input interface circuit 92, there are connected wheel speed sensors 100, 102, 104, 106 and a brake switch 110 through respective amplifiers 98. The wheel speed sensors 100, 102, 104 and 106 are adapted to detect the rotating speeds of the wheels RL, FR, FL and RR, respectively, while the brake switch 110 is turned on when the brake pedal 10 is depressed or operated by an operator or driver of the FF vehicle.

Figure 3:
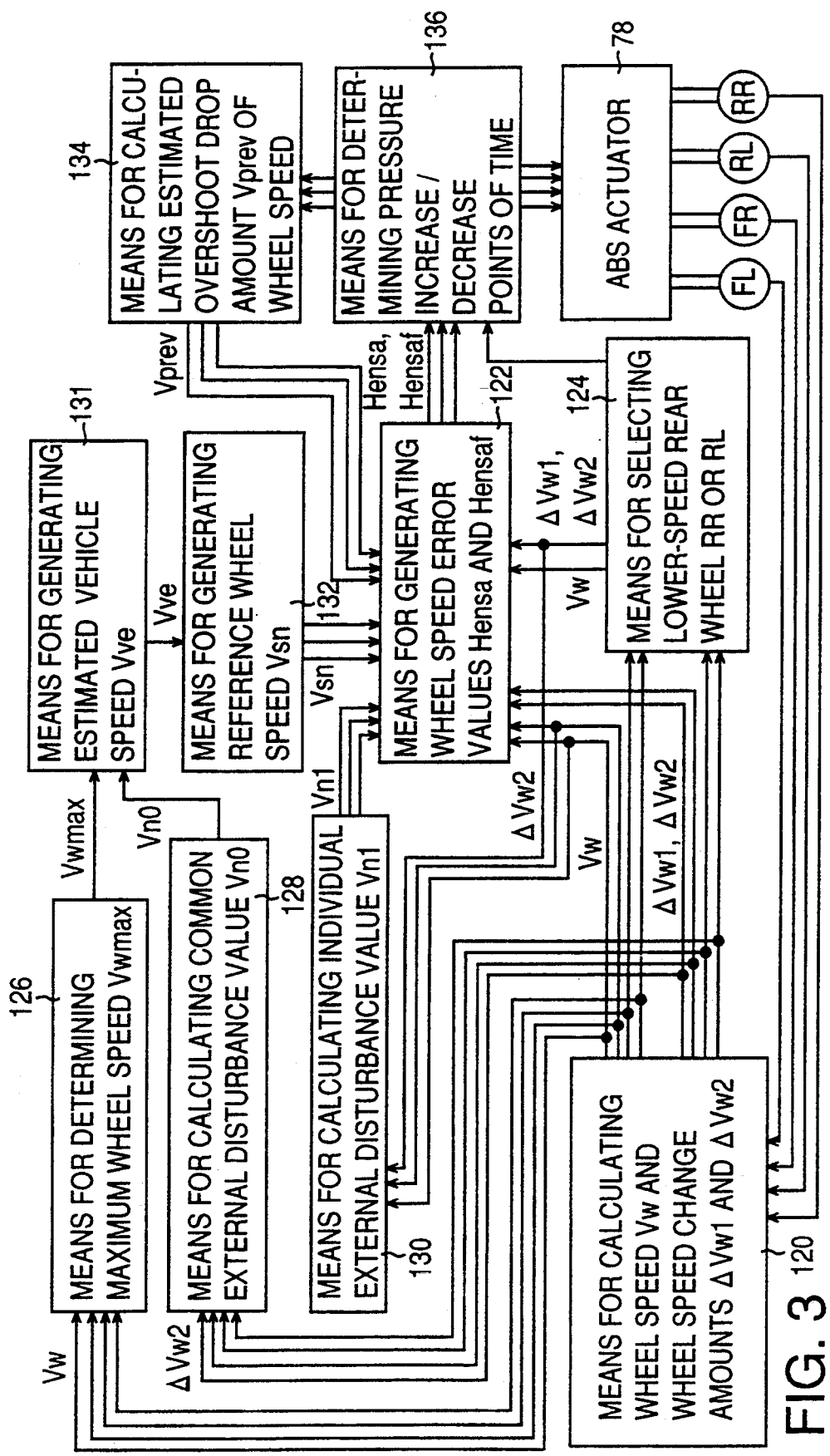
FIG. 3 is a schematic block diagram illustrating a functional arrangement of the control device of FIG. 2.

The ROM 86 stores various control programs necessary to regulate the brake pressures to be applied to the brake cylinders 26, 36, 46, 54, in an anti-lock fashion as described below in detail. The computer 82 incorporates various functional means as illustrated in the diagram of FIG. 3, in which circles represent the wheels FL, FR, RL, RR whose brake pressures are controlled by the ABS actuator 78. The number of lines connecting the individual functional blocks in FIG. 3 correspond to the number of the wheels for which the data or signals indicated by the lines are used.

The output signals of the wheel speed sensors 104, 102, 100, 106 are applied to calculating means 120, which is adapted to calculate speeds Vw of the wheels FL, FR, RL, RR and amounts of change $\Delta$Vw of the wheel speeds Vw (more precisely, first and second relative wheel speed change amounts $\Delta$Vw1 and $\Delta$Vw2 for which will be discussed below in detail), on the basis of the received output signals of the wheel speed sensors. The wheel speeds Vw and first and second relative speed change amounts $\Delta$Vw1 and $\Delta$Vw2 of the front wheels FL, FR which are calculated by the calculating means 120 are applied to generating means 122 for generating present and future wheel speed error values Hensa and Hensaf (which will be described). At the same time, the calculated wheel speeds Vw of the rear wheels RL, RR and relative wheel speed change amounts $\Delta$Vw1 and $\Delta$Vw2 are applied to selecting means 124 for selecting one of the rear wheels RL, RR whose speed Vw is lower than the other. The selecting means 124 applies the speed Vw and change amounts $\Delta$Vw1, $\Delta$Vw2 of the selected lower-speed rear wheel RL or RR to the generating means 122.

The computer 82 further incorporates determining means 126 for determining a highest one of the speeds Vw of the front and rear wheels FL, FR, RL, RR as a maximum wheel speed Vwmax, and calculating means 128 and 130 for calculating a common external disturbance value Vn0 and individual external disturbance values Vn1, respectively. The disturbance value Vn0 is common to the four wheels FL, FR, RL, RR while the disturbance values Vn1 are specific to the respective wheels.

The computer 82 further incorporates generating means 131 for generating an estimated vehicle speed Vve on the basis of the maximum wheel speed Vwmax and the common external disturbance value Vn0, and generating means 132 for generating a reference wheel speed Vsn for each of the front wheels FL, FR and the selected lower-speed rear wheel RL or RR, on the basis of the generated estimated vehicle speed Vve. The generated reference wheel speed Vsn is fed to the generating means 122 indicated above. The generating means 122 also receives the individual external disturbance values Vn1 from the calculating means 130, and an estimated overshoot drop amount vprev of the wheel speed calculated by calculating means 134.

The generating means 122 is arranged to generate the present and future error values Hensa and Hensaf, on the basis of the received data, i.e., wheel speeds Vw, relative wheel speed change amounts $\Delta$Vw1, $\Delta$Vw2, reference wheel speed Vsn, individual external disturbance values Vn1 and overshoot drop amounts Vprev obtained for the front wheels FL, FR and the selected lower-speed rear wheel RL or RR. The computer 82 also incorporates determining means 136 which determines, on the basis of the error values Hensa and Hensaf received from the generating means 122, the points of time at which the solenoid-operated values of the ABS actuator 78 are commanded to increase or decrease the brake pressures for the wheels FL, FR, RL, RR.

The brake pressures for the rear left and right wheels RL, RR are controlled in a so-called "selectro-control fashion" in which a control command generated for the selected lower-speed rear wheel RL or RR is also used for the non-selected higher-speed rear wheel, so that the points of time at which the brake pressure decrease is terminated differ for the selected and non-selected rear wheels RL, RR. That is, as described below in detail, the point of time at which the brake pressure decrease for the non-selected (higher-speed) rear wheel RL or RR is terminated is delayed or retarded with respect to the corresponding point of time for the selected (lower-speed) rear wheel RL or RR, so as to purposely reduce the slip amount of the higher-speed rear wheel for thereby increasing the speed Vw of that higher-speed rear wheel toward the actual vehicle speed. In this sense, the non-selected or higher-speed rear wheel is referred to as "speed monitoring wheel" where appropriate.

Referring to the flow chart of FIG. 4, there will be described the operation of the calculating means 120. The flow chart illustrates a routine to be executed by the calculating means 120 at a predetermined cycle time CYCT (e.g., 5 msec) for each of the front and rear wheels FL, FR, RL, RR.

Figure 4:
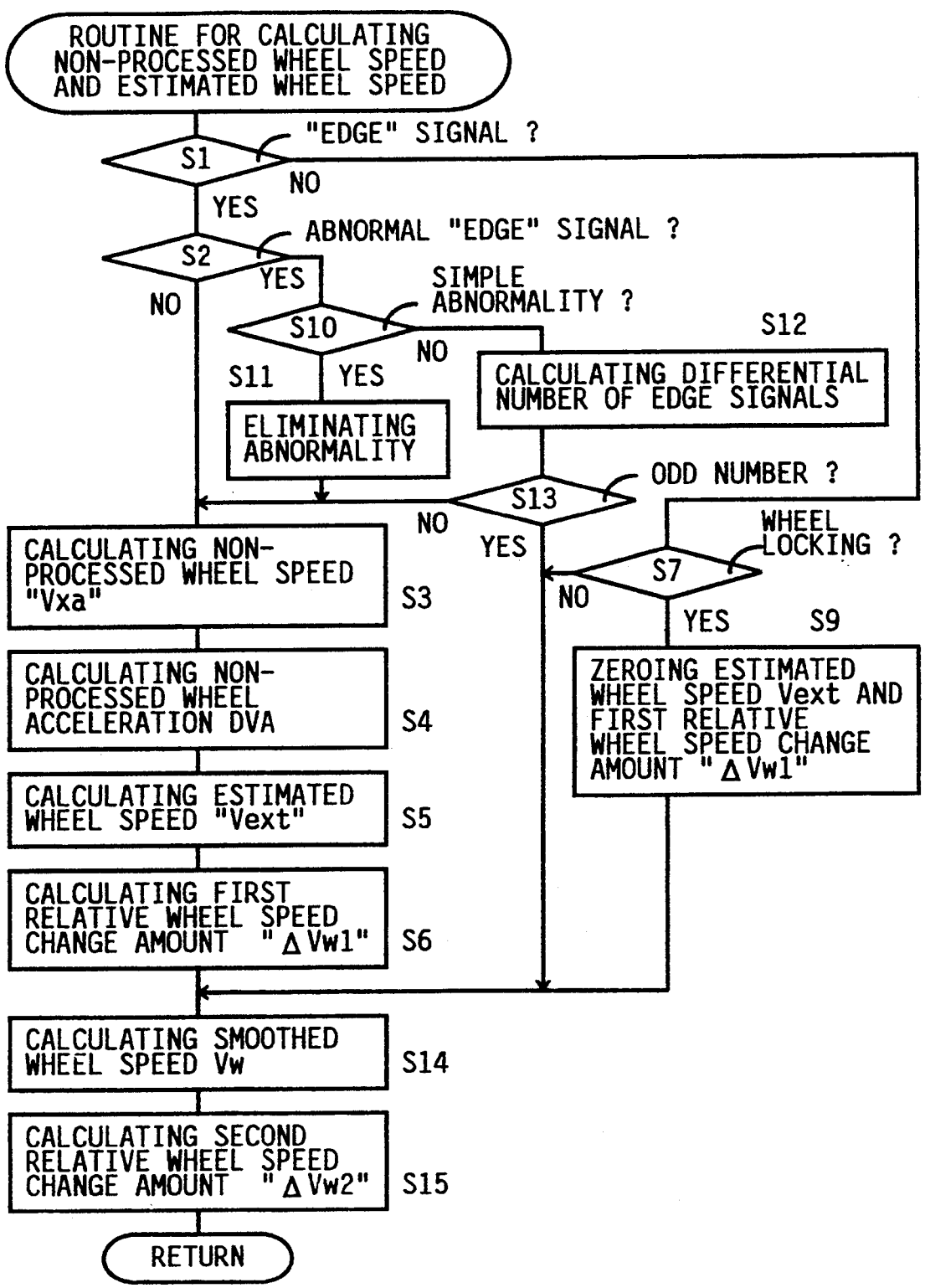
FIG. 4 is a flow chart illustrating a routine performed by means 120 of FIG. 3 for calculating a wheel speed Vw of the vehicle and amounts of change $\Delta Vw1$ and $\Delta Vw2$ of the wheel speed.

For understanding first step S1 of the routine of FIG. 4, explanation of the arrangement of each wheel speed sensor 100, 102, 104, 106 indicated above is deemed necessary. Each wheel speed sensor (e.g., 100) includes a toothed rotor which rotates with the corresponding wheel (e.g., RL), and a stationary electromagnetic pick-up disposed in opposed relationship with the teeth of the rotor, which has a predetermined pitch. The pick-up is adapted to electromagnetically detect passage of each tooth of the rotor. The pick-up produces an output in the form of a voltage signal whose level changes during rotation of the rotor, crossing a threshold or zero level alternately upwards or downwards between nominal high and low levels. With the output voltage changing with respect to the threshold level, there is generated a pulse signal whose rise and fall (indicated by ↑ and ↓ in FIG. 5) correspond to the edges of each tooth of the rotor of the wheel speed sensor. Further, upon occurrence of each of the rises and falls of the pulse signal, an EDGE signal is generated.

Figure 5:
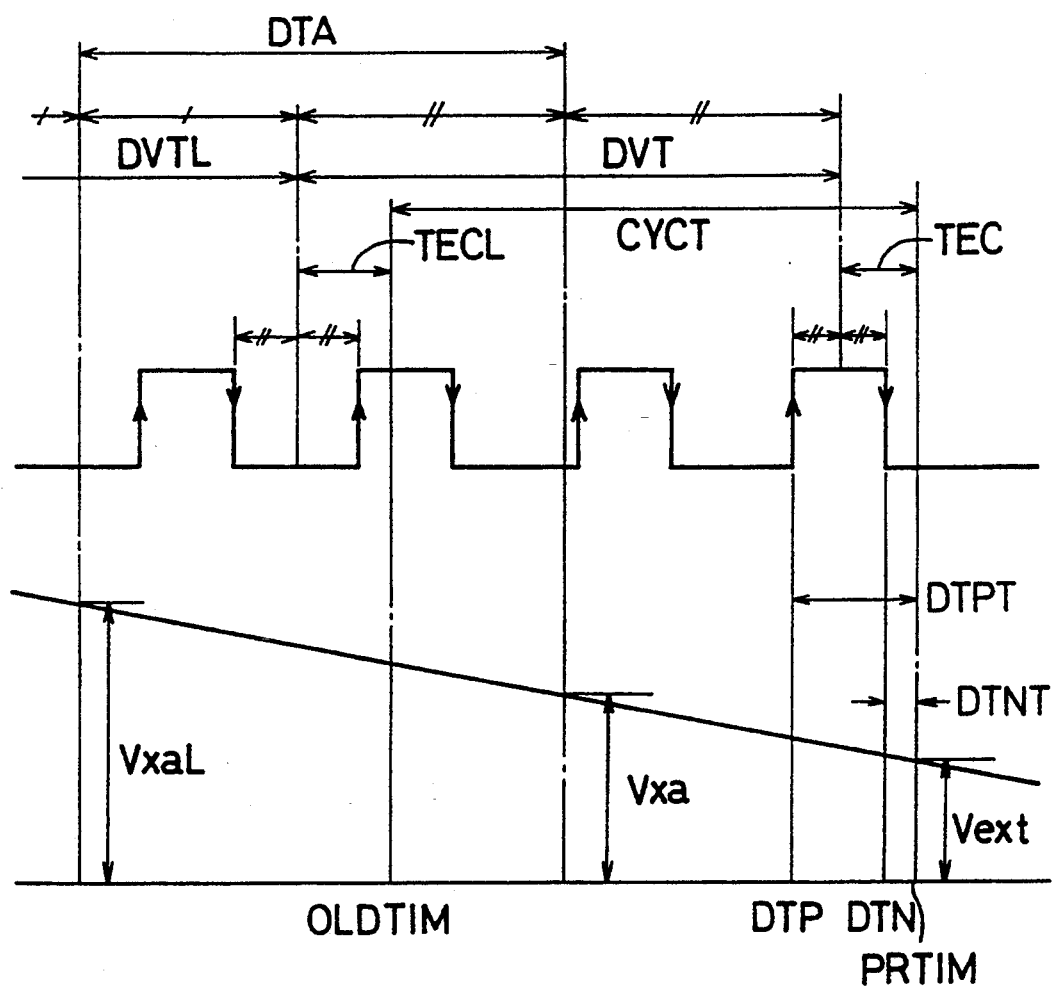
FIG. 5 is a view for explaining an operation performed by the above means 120 for calculating an estimated wheel speed Vext by extrapolation.

The above-indicated step S1 is provided to determine whether at least one EDGE signal has been generated during a sampling period which is equal to the cycle time. That is, the sampling takes place at the predetermined cycle time CYCT. An example of the sampling period is indicated in FIG. 5, as a period between the present sampling point PRTIM and the last sampling point OLDTIM.

Normally, an affirmative decision (YES) is obtained in step S1, and the control flow goes to step S2 to determine whether a time interval between the last two EDGE signals is smaller than a predetermined lower limit or larger than a predetermined upper limit, to thereby determine whether any abnormality associated with the EDGE signal or signals is present or not. Described in detail, the time interval between the adjacent EDGE signals will not change abruptly to a large extent as long as the rotor of the wheel speed sensor is rotating with the corresponding vehicle wheel. On the other hand, an EDGE signal may not be generated if the electromagnetic pick-up fails to detect an edge of a tooth of the rotor due to an excessive amount of eccentricity of the rotor, for example. Alternatively, a pseudo-EDGE signal may be generated due to a mechanical or electric noise associated with the wheel sensor. In such events, the time interval between adjacent EDGE signals is extremely long or short as compared with that during normal operation of the wheel sensor. If the output voltage of the electromagnetic pick-up is excessively lowered and does not reach the threshold level during running of the vehicle at a relatively low speed, an EDGE signal is absent. In this case, too, the time interval between the adjacent EDGE signals is longer than the predetermined upper limit. Thus, the abnormality associated with the last EDGE signal is checked in step S2 depending upon the time interval between the adjacent EDGE signals one of which is the last detected EDGE signal.

Normally, a negative decision (NO) is obtained in step S2, and step S3 is implemented next. Reference is now made to FIG. 5 wherein there is shown a rectangular pulse signal which is generated based on the output voltage of the electromagnetic pick-up of the wheel sensor (e.g., the sensor 100). The pulse signal has rises and falls indicated by ↑ and ↓. The EDGE signals occur corresponding to these rises and falls of the pulse signal. The last two adjacent EDGE signals with respect to the present sampling point PRTIM were generated at points of time DTP and DTN which correspond to the last rise and fall of the pulse signal. An average time length TEC of a time length DTPT between DTP and PRTIM and a time length DTNT between DTN and PRTIM is obtained as TEC=(DTPT+DTNT)/2. An average time length TECL with respect to the last sampling point OLDTIM is similarly obtained. The last sampling point OLDTIM is a point of time at which the affirmative decision (YES) was obtained in the last cycle of execution of the routine of FIG. 4. Step S3 is provided to calculate a non-processed wheel speed Vxa according to the following equations, on the basis of the average time lengths TEC and TECL, and a time length CN×CYCT between the last and present sampling points OLDTIM and PRTIM, where CN represents a natural number, which is equal to "1" in the specific example of FIG. 5.

$$DVT = TECL - TEC + CN \times CYCT$$

$$Vxa = VCNV \times EN/DVT$$

where, VCNV is a constant determined by a diameter ratio of the rotor of the wheel speed sensor (e.g., the sensor 100) and the corresponding wheel (e.g., rear left wheel RL), a diameter of the rotor, and the pitch of the rotor teeth, while EN represents the number of the EDGE signals generated between the present sampling period between OLDTIM and PRTIM.

Normally, that is, when at least one EDGE signal is generated during the present sampling period, the value CN is equal to "1". If at least one EDGE signal was not generated in the sampling period preceding the last sampling point OLDTIM (in the last cycle n−1 of execution of the routine of FIG. 4), the value CN is "2" or a larger natural number.

It is noted that "L" as in the symbol "TECL" indicates the last cycle n−1 with respect to the present cycle n of execution of the routine of FIG. 4. Therefore, "TECL" is the average time length TEC obtained with respect to the last sampling point OLDTIM. This rule applies to the symbols representing the other parameters indicated in FIG. 5.

The calculation of the non-processed wheel speed Vxa according to the above two equations is obtained in step S3 for each of the four wheels. In practice, therefore, the following equations are used to calculate the values Vxa of the individual wheels FL, FR, RL, RR:

$$DVT(I) = TECL(I) - TEC(I) + CN(I) \times CYCT$$

$$Vxa(I) \ VCNV \times EN(I)/DVT(I)$$

where, I is equal to 1, 2, 3 and 4 for the wheels FL, FR, RL and RR, respectively.

In the present embodiment, the non-processed wheel speed values Vxa are calculated on the basis of the time interval DVT between a point intermediate between the points of generation of the two adjacent EDGE signals immediately preceding the present sampling point PRTIM, and a point intermediate between the points of generation of the two adjacent EDGE signals immediately preceding the last sampling point OLDTIM, According to this arrangement, the non-processed wheel speed values Vxa may be obtained with high accuracy, even if the time interval from the point of generation of the EDGE signal corresponding to a rise of the pulse signal to that of the EDGE signal corresponding to a fall of the pulse signal is different from the time interval from the point of generation of the EDGE signal corresponding to the fall to that of the EDGE signal corresponding to the rise, as in the example of FIG. 5, provided the rotor of the wheel speed sensor is rotating at a constant speed.

Step S3 is followed by step S4 to calculate a non-processed wheel acceleration value DVA according to the following equations:

$$DTA = (DTVL + DVT)/2$$

$$DVA = GCNV \times (Vxa - VxaL)/DTA$$

where, GCNV represents a constant for expressing the wheel acceleration value in km/hr$^2$.

Then, the control flow goes to step S5 to calculate by extrapolation an estimated wheel speed Vext at the present sampling point PRTIM, and then to step S6 to calculate the first relative wheel speed change amount $\Delta Vw1$.

The estimated wheel speed Vext at the present sampling point PRTIM (namely, at each sampling point) is calculated by extrapolation on the basis of a suitably selected number of the non-processed wheel speed values already obtained in step S3, on the assumption that the wheel speed Vw will change at the same rate as in the preceding period. In the present example, the value Vext is calculated from the two wheel speed values Vxa and VxaL obtained in the present and last cycles n and n−1, according to the following equation:

$$Vext = Vxa + (Vxa - VxaL) \times (DVT/2 + TEC)/DTA$$

Conventionally, the non-processed values Vxa obtained on the basis of the EDGE signals generated prior to the present sampling point PRTIM are used as the wheel speed at the present sampling point. Accordingly, there is some time delay (=TEC+DVT/2) between the present time and the point of time at which the values Vxa are effective. This time delay varies from time to time, and this variation is one of the causes for a control error in regulating the brake pressures for the wheels. Further, the time delay tends to increase with a decrease in the vehicle speed. In the light of this tendency, the conventional control system inhibits the regulation of the brake pressures in the anti-lock fashion to avoid inadequate control of the brake pressures when the vehicle speed is lower than a predetermined lower limit (e.g., 7 km/hr).

In the present embodiment, however, the wheel speed values Vext for the wheels are estimated at each sampling point (at the present sampling point) at the predetermined cycle time CYCT, whereby the brake pressures can be regulated with adequate timings of commencing and terminating the pressure decrease without a delay. This feature cooperates with the other features (described below) of the present embodiment to permit optimum anti-lock control of the brake pressures even at a vehicle speed lower than 7 km/hr, for example.

The calculation of the first relative wheel speed change amount $\Delta Vw1$ in step S6 is effected on the basis of the following values: a smoothed wheel speed Vw obtained in step S14 in the last cycle n−1; the estimated wheel speed Vext obtained in step S5 in the present cycle n; an estimated vehicle speed change amount $\Delta Vve$ obtained in the last cycle n−1; and a compressed value of the first change amount $\Delta Vw1$ in the last cycle n−1. The meaning of "compression" of the first change amount $\Delta Vw1$ will become apparent from the following description.

To calculate the present first relative wheel speed change amount $\Delta Vw1$, a pre-compressed first change amount $\Delta Vwx1$ is initially calculated according to the following equation.

$$Vtmp = Vw_{n-1} + \Delta Vve$$

$$\Delta Vwx1_n = \Delta Vw1_{n-1} \times C1 + (Vext - Vtmp) \times C2$$

$$C1 = 1 - 2 \times C2$$

In the present embodiment, C1 is 0.5 while C2 is 0.25. The values with the subscript "n" and "n−1" in the above equations are values obtained in the present and last cycles, respectively. The estimated vehicle speed change amount $\Delta Vve$ is an amount of change of the estimated vehicle speed Vve (which will be explained) during the cycle time CYCT.

The above value Vext−Vtmp is equal to (Vext−Vw$_{n-1}$)−$\Delta Vve$, which corresponds to an amount of change of the present value (obtained in the present cycle n) of the wheel speed (relative wheel speed Vwv) relative to the estimated vehicle speed Vve, from the preceding value obtained in the last cycle n−1. Namely, the value (Vext−Vw$_{n-1}$)−$\Delta Vve$ is an amount of change of a difference (Vw−Vve) between the wheel speed Vw and the estimated vehicle speed Vve, more precisely, an amount of change of the present value of the difference (Vw−Vve) with respect to the last value (obtained in the last cycle). The pre-compressed first relative wheel speed change amount $\Delta Vwx1$ is an incomplete integral of the above-defined amount of change of the relative wheel speed Vwv or difference (Vw−Vve), which is referred to as a first integral as distinguished from a second integral which will be described.

Figure 6:
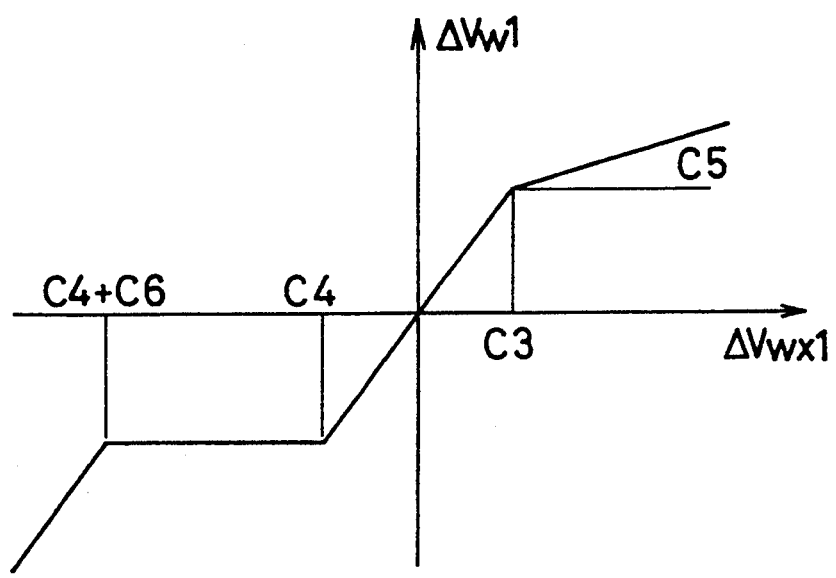
FIG. 6 is a graph for explaining compression of the first change amount $\Delta Vw1$ of the wheel speed calculated by the above means 120.

The pre-compressed first change amount $\Delta Vwx1$ is then compressed to obtain the compressed first relative wheel speed change amount $\Delta Vw1$, according to the following equations and as shown in the graph of FIG. 6.

```
ΔVw1 = ΔVwx1
IF (ΔVw1 > C3) THEN
   ΔVw1 = C3 + (ΔVw1 − C3) × C5
IF (ΔVw1 < C4) THEN
   IF (ΔVw1 < C4 + C6) THEN
      ΔVw1 = ΔVw1 + C6
   ELSE
      ΔVw1 = C4
   END IF
END IF
``` where, C3=0.525, C4=−0.35, C5=0.125 C6=−2.1

It will be understood from the graph of FIG. 6 that the "compression" of the pre-compressed change amount $\Delta Vwx1$ into the compressed first relative wheel speed change amount $\Delta Vw1$ takes place where the pre-compressed value $\Delta Vwx1$ is larger than a predetermined upper limit C3 or smaller than a predetermined lower limit C4. This compression is based on an assumption that the pre-compressed value $\Delta Vwx1$ outside a range defined by the upper and lower limits C3, C4 includes a noise, and that this noise should be eliminated by the compression. Namely, the conversion of the pre-compressed value $\Delta Vwx1$ into the compressed value $\Delta Vw1$ is based on an assumption that an excessive rate of change of the relative wheel speed Vwv as expressed by the pre-compressed value $\Delta V_{wx1}$ larger than the upper limit C3 or smaller than the lower limit C4 would not occur during normal running of the vehicle on an ordinary road surface.

However, such excessive rate of change may occur when the vehicle is braked on a road surface having a considerably low friction coefficient $\mu$ or when the friction coefficient $\mu$ of the road surface is suddenly lowered. In this event, the pre-compressed change amount $\Delta V_{wx1}$ may be smaller than a predetermined second lower limit C4+C6. To avoid delayed reduction in the brake pressures for the wheels FL, FR, RL, RR in such event, the pre-compressed value $\Delta V_{wx1}$ smaller than that lower limit C4+C6 is not compressed as indicated in the graph of FIG. 6.

The compressed first relative wheel speed change amount $\Delta V_{w1}$ thus obtained from the pre-compressed first change amount $\Delta V_{wx1}$ generated in the last cycle n−1 is used as the first relative wheel speed change amount $\Delta V_{w1}$ in the present cycle n. The "first change amount $\Delta V_{w1}$" is hereafter interpreted to mean the first relative wheel speed change amount compressed according to the predetermined relationship between $\Delta V_{w1}$ and $\Delta V_{wx1}$ as described above.

The upper and lower limits C3, C4 and C6 are expressed in unit of km/hr/5 msec, and the above-specified values of these limits C3, C4 and C6 are equivalent to 3 G, −2 G and −12 G, respectively, where G represents gravitational acceleration unit. The upper limit C3 of 3 G and the lower limit C4 of −2 G define a permissible range of acceleration and deceleration of the vehicle during running on a road surface having a relatively good condition (having sufficiently high friction coefficient). A deceleration value of the vehicle lower than the lower limit (C4+C6) of −14 G (=−2 G−12 G) means that the friction coefficient $\mu$ of the road surface is excessively low, causing easy locking of the vehicle wheels. In this case, the first relative wheel speed change amount $\Delta V_{w1}$ is obtained without compression of the pre-compressed value $\Delta V_{wx1}$.

Thus, the first change amount $\Delta V_{w1}$ of the relative wheel speed $V_{wv}$ is determined to control the brake pressures so as to meet various road surface conditions, namely, both good and bad road surfaces having different values of friction coefficient $\mu$.

As indicated above, the relative wheel speed $V_{wv}$ indicated above is expressed by the following equation:

$$V_{wv} = V_w - V_{ve}$$

On the other hand, the present wheel speed error value Hensa generated by the generating means 122 as described below in detail is expressed by the following equation:

$$Hensa = V_w - V_{sn}$$

Since the amounts of change during the cycle time CYCT of the estimated vehicle speed $V_{ve}$ and the reference wheel speed $V_{sn}$ generated by the generating means 132 as described below in detail are substantially equal to each other, an amount of change $\Delta V_{wv}$ (=$\Delta V_{w1}$) of the relative wheel speed $V_{wv}$ is substantially equal to an amount of change $\Delta$Hensa of the present wheel speed error value Hensa.

The first relative wheel speed change amount $\Delta V_{w1}$ (=$\Delta V_{wv}$) is defined by the following equation:

$$\Delta V_{w1n} \Delta V_{wvn} = (V_w - V_{ve})_n - (V_w - V_{ve})_{n-1} = (V_w - V_{sn})_n - (V_w - V_{sn})_{n-1}$$

It will thus be understood that the first change amount $\Delta V_{w1}$ which is the amount of change $\Delta V_{wv}$ of the relative wheel speed $V_{wv}$ (=difference $V_w - V_{ve}$) is equal to the amount of change $\Delta$Hensa of the present wheel speed error value Hensa.

The relative wheel speed $V_{wv}$ may be considered to be an error value of the wheel speed $V_w$. By effecting a filtering operation to remove this error component, the first relative wheel speed change amount $\Delta V_{w1}$ can be correctly obtained, in spite of an error included in the absolute value of the estimated vehicle speed $V_{ve}$, provided that the gradient of the value $V_{ve}$ is correct.

Further, by using the non-processed estimated wheel speed $V_{ext}$ as an input to the digital filter for the first relative wheel speed change amount $\Delta V_{w1}$, it is possible to avoid an error of quantization of the wheel acceleration value (i.e., first relative wheel speed change amount $\Delta V_{w1}$). As is apparent from the following explanation, therefore, the filter for the wheel speed may also serve as a digital filter for the wheel acceleration, which filter is conventionally required in addition to the filter for the wheel speed.

Referring back to step S1, the control flow goes to step S7 if a negative decision (NO) is obtained in step S1, namely, if at least one EDGE signal has not been generated during the present sampling period (between PRTIM and OLDTIM). Step S7 is implemented to determine whether each wheel of the vehicle is in a locked state (state of skidding on the road surface) or not. This determination is effected by checking if a predetermined time T1 (e.g., 55 msec) has passed after the moment of generation of the last normal EDGE signal (rise or fall of the pulse signal based on the output of the wheel speed sensor 100, 102, 104, 106). If the predetermined time T1 has not expired yet, this means that the wheel in question is not being locked. If the time T1 has already expired (before the present sampling point PRTIM), this means the locking of the wheel.

If the negative decision (NO) is obtained in step S7, steps S3 through S6 are not implemented, and the non-processed estimated wheel speed $V_{ext}$ and the first relative wheel speed change amount $\Delta V_{w1}$ are not updated in the present cycle n. Consequently, the last calculated first relative wheel speed change amount $\Delta V_{w1}$ remains effective if the wheel is not locking.

However, it is possible to calculate by extrapolation the present non-processed estimated wheel speed $V_{ext}$ according to the following equation including the cycle time CYCT, to update the first change amount $\Delta V_{w1}$, even when any EDGE signal has been generated during the present sampling period.

$$V_{ext} = V_{ext} + (V_{xa} - V_{xaL}) \times CYCT/DTA$$

If the affirmative decision (YES) is obtained in step S7, the control flow goes to step S9 to zero the currently effective non-processed estimated wheel speed $V_{ext}$ and first relative wheel speed change amount $\Delta V_{w1}$.

If any abnormality associated with the EDGE signal or signals is found in step S2, step S10 is implemented to determine whether the abnormality is of a simple nature or not, that is, whether the abnormality is the missing of an EDGE signal or signals which should have been generated, or the generation of a pseudo-EDGE signal or signals which should not have been generated. In other words, the abnormality of a simple nature can be dealt with by adding the missing EDGE signal or signals or by eliminating the pseudo-EDGE signal or signals. If an affirmative decision (YES) is obtained in step S10, step S11 is implemented to add or eliminate the EDGE signal or signals which caused the abnormality. Step S11 is followed by step S3 and the subsequent steps. If a negative decision (NO) is obtained in step S10, that is, if the abnormality is not of a simple nature, the control flow goes to step S12 to first calculate an estimated number of the EDGE signals (during the present sampling period) which represents the present wheel speed $Vw_n$ that is closest to the last wheel speed $Vw_{n-1}$ but is lower than the maximum wheel speed Vwmax (determined in the last cycle n−1 by the determining means 126 as described below in detail). Then, in step S12, a differential number of the EDGE signals is calculated by subtracting the actual number of the EDGE signals (generated during the sampling period) from the calculated estimated number of the EDGE signals.

Step S12 is followed by step S13 to determine whether the differential number of the EDGE signals obtained in step S12 is an odd number or not. Normally, a pair of EDGE signals are generated corresponding to a rise and a fall of the pulse signal, that is, corresponding to upward and downward zero-crossings of the output voltage of the electromagnetic pick-up of the wheel speed sensor, for each peak of the output voltage. Therefore, the number of the EDGE signals normally generated during each sampling period is even. Accordingly, only when a negative decision (NO) is obtained in step S13, steps S3 through S6 are implemented with respect to the estimated number of the EDGE signals obtained in step S12, namely, with the actually detected number of the EDGE signals being changed by the compensated number also obtained in step S12. If the compensated number of the EDGE signals obtained in step S12 is odd, this means the missing of an EDGE signal due to some abnormality, and therefore steps S3 through S6 are not implemented. In this case, the non-processed estimated wheel speed Vext is not updated, for example. The determination in step S13 is effected by determining whether an equality 2 m−1<compensated number of the EDGE signals <2 m+1 (where m is an integer) is satisfied or not.

After step S6 is completed or when the negative decision (YES) is obtained in step S13, the control flow goes to step S14 to calculate the smoothed wheel speed Vw. The calculation of the smoothed wheel speed Vw is effected according to the following equation, on the basis of the first relative wheel speed change amount $\Delta Vw1_n$ obtained in step S6 of the present cycle n, the smoothed wheel speed $Vw_{n-1}$ obtained in step S14 in the last cycle n−1 and an amount of change $\Delta Vve$ of the estimated vehicle speed Vve.

$$Vw_n = Vw_{n-1} + \Delta Vve + \Delta Vw1_n = Vtmp + \Delta Vw1_n$$

Thus, the smoothed wheel speed Vw is calculated by integrating the first relative wheel speed change amount $\Delta Vw1$ and the change amount $\Delta Vve$ of the estimated wheel speed Vve, and is referred to as the second integral.

It will be understood that the smoothed wheel speed Vw is obtained on the basis of the above-indicated second integral which is based on the first integral indicated above. Further, the smoothed wheel speed Vw is free from the noise owing to the "compression" of the pre-compressed first change amount $\Delta Vwx1$ into the compressed value $\Delta Vw1$. It will also be understood that the portion of the computer 82 assigned to calculate the first relative wheel speed change amount $\Delta Vw1$ and smoothed wheel speed Vw serves as the filter for filtering the wheel speed and the wheel acceleration value (amount of change of the relative wheel speed).

Step S14 is followed by step S15 in which the second amount of change $\Delta Vw2$ of the relative wheel speed Vwv during a 40 msec period is calculated on the basis of the first relative wheel speed change amount $\Delta Vw1$, according to the following equation:

$$\Delta Vw2_n = \Delta Vw2_{n-1} \times \tfrac{7}{8} + \Delta Vw1$$

The second relative wheel speed change amount $\Delta Vw2$ is an integral of the first relative wheel speed change amount $\Delta Vw1$ during the 40 msec period, that is, during a period eight times as long as the cycle time CYCT (5 msec in this embodiment). Accordingly, the second relative wheel speed change amount $\Delta Vw2$ may be calculated by summing the eight values of the first relative wheel speed change amount $\Delta Vw1$ obtained in the last eight sampling periods. This calculation, however, requires storing the last eight values of the first change amount $\Delta Vw1$. To reduce the required memory capacity of the computer 82, the present embodiment is adapted to calculate the second relative wheel speed change amount $\Delta Vw2$ according to the above equation.

Alternatively, the second relative wheel speed change amount $\Delta Vw2$ may be calculated by obtaining a weighted mean of the pre-compressed first change amount $\Delta Vwx1$ and the compressed first relative wheel speed change amount $\Delta Vw1$ according to the following equations:

$$Tmp = \Delta Vwx1_n \times 0.25 + \Delta Vw1_n \times 0.75$$

$$\Delta VW2_n = \Delta Vw2_{n-1} \times \tfrac{7}{8} + Tmp$$

The calculating means 120 is adapted to execute the routine of FIG. 4 for each of the four wheels FL, FR, RL and RR, whereby the four values of the smoothed wheel speed Vw and the four values of the first and second relative wheel speed change amounts $\Delta Vw1$ and $\Delta Vw2$ are obtained for the respective four wheels.

The smoothed wheel speed Vw will be hereinafter referred to simply as wheel speed Vw, unless the adjective "smoothed" is necessary for some reason or other. Symbols Vwfl, Vwfr, Vwrl and Vwrr will be used to represent the speeds of the wheels FL, FR, RL and RR, respectively.

The wheel speeds Vwfl, Vwfr, Vwrl and Vwrr are fed to the determining means 126, which determines the highest one of these wheel speeds as the maximum wheel speed Vwmax.

The present brake system is designed so that the amounts of slip of the rear wheels RL, RR under braking are smaller than those of the front wheels FL, FR, as long as the friction coefficient $\mu$ of the road surface is held almost uniform for the four wheels (in particular, almost equal for the front and rear wheels). Consequently, one of the rear wheel speeds Vwrl and Vwrr is the highest of the four wheel speeds. That is, a higher one of the rear wheel speeds Vwrl and Vwrr is determined as the maximum wheel speed Vwmax.

The four values of the second relative wheel speed change amounts $\Delta Vw2$ of the four wheels, which are calculated by the calculating means 120, are applied to the disturbance calculating means 128 and 130 for calculating the common and individual external disturbance values Vn0 and Vn1, respectively.

As indicated above, the relative wheel speed Vwv is considered to be an error of the wheel speed Vw, and the amount of change $\Delta Vw1$ of the relative wheel speed Vwv is the first relative wheel speed change amount $\Delta Vw1$. Therefore, the second change amount $\Delta Vw2$ obtained by integrating the first change amount $\Delta Vw1$ may also be considered as an amount of change of the relative wheel speed Vwv. The second relative wheel speed change amount $\Delta Vw2$ increases with an increase in the external disturbance values which result from the waviness or bumpiness of the road surface and the vibrations of the wheels, for example. Accordingly, the external disturbances may be estimated from the second amount of change $\Delta Vw2$ of the relative wheel speed Vwv.

The calculating means 128 for calculating the common external disturbance value Vn0 receives from the determining means 136 data (not shown in FIG. 3) indicating that a predetermined time (e.g., 40 msec) has passed after commencement of regulation of the brake pressures in the brake cylinders 26, 36, 46, 54, and data (not shown in FIG. 3) indicative of the brake cylinder or cylinders whose brake pressure is in the process of increasing. After this predetermined time has passed after the commencement of regulation of the brake pressures, the calculating means 128 selects, as a minimum value $\Delta Vw2min$ (negative value), the smallest one of the values of the second relative wheel speed change amount $\Delta Vw2$ of the wheels corresponding to the brake cylinders whose brake pressures are increasing. The calculating means 128 then calculates the common external disturbance value Vn0 on the basis of the minimum value $\Delta Vw2min$ according to the following equations:

```
Tmp = 0
IF (the pressure is increasing, and ΔVw2min < Tmp) THEN
    Tmp = ΔVw2min
Vn0 = MAX(Vn0 − C7, −Tmp × C8)
```

The constant or gain C8 is a square root of ½. The gain C8 should be sufficiently small to assure sufficient stability of regulation of the brake pressures, since the common external disturbance value Vn0 is based on the minimum value $\Delta Vw2min$ which is the smallest one of the four values of the second relative wheel speed change amount $\Delta Vw2$ of the four wheels.

The above equation $Vn0=MAX(Vn0−C7, −Tmp \times C8)$ is formulated so that the common external disturbance value Vn0 increases with an increase in the absolute value $|\Delta Vw2min|$, and so that the rate of decrease in the value Vn0 with a decrease in the absolute value $|\Delta Vw2min|$ does not exceed C7/CYCT.

The common external disturbance value Vn0, which is the magnitude of the external disturbance common to all the four wheels FL, FR, RL and RR, is obtained according to the above equation so that the value Vn0 changes at a comparatively high rate while the road surface condition is deteriorated, and at a comparatively low rate while the road surface condition is improved. The disturbance value Vn0 is relatively highly responsive to disturbances (e.g., bumpiness of the road surface) whose magnitude changes in a comparatively large degree at a comparatively low frequency, which disturbances result, for example, from a road surface whose waviness or bumpiness slowly changes in a comparatively large amount.

The calculating means 130 calculates the individual disturbance values Vn1 of the wheels by smoothing the positive values of the second relative wheel speed change amount $\Delta Vw2$ of the front wheels FL, FR and the selected lower-speed rear wheel RL or RR, according to the following equation:

$$Vn1 = Vn1 + \{MAX(0, \Delta Vw2 \times C9 - Vn1)\}/20$$

The disturbance values Vn1 are specific to the individual wheels, and change at a relatively high rate, being relatively highly responsive to disturbances whose magnitude changes in a comparatively large degree at a comparatively high frequency. These disturbances result, for example, from vibrations of the wheels.

The generating means 131 generates the estimated vehicle speed Vve, on the basis of the common disturbance value Vn0 obtained by the calculating means 128 and the maximum wheel speed Vwmax obtained by the determining means 126.

Figure 7:
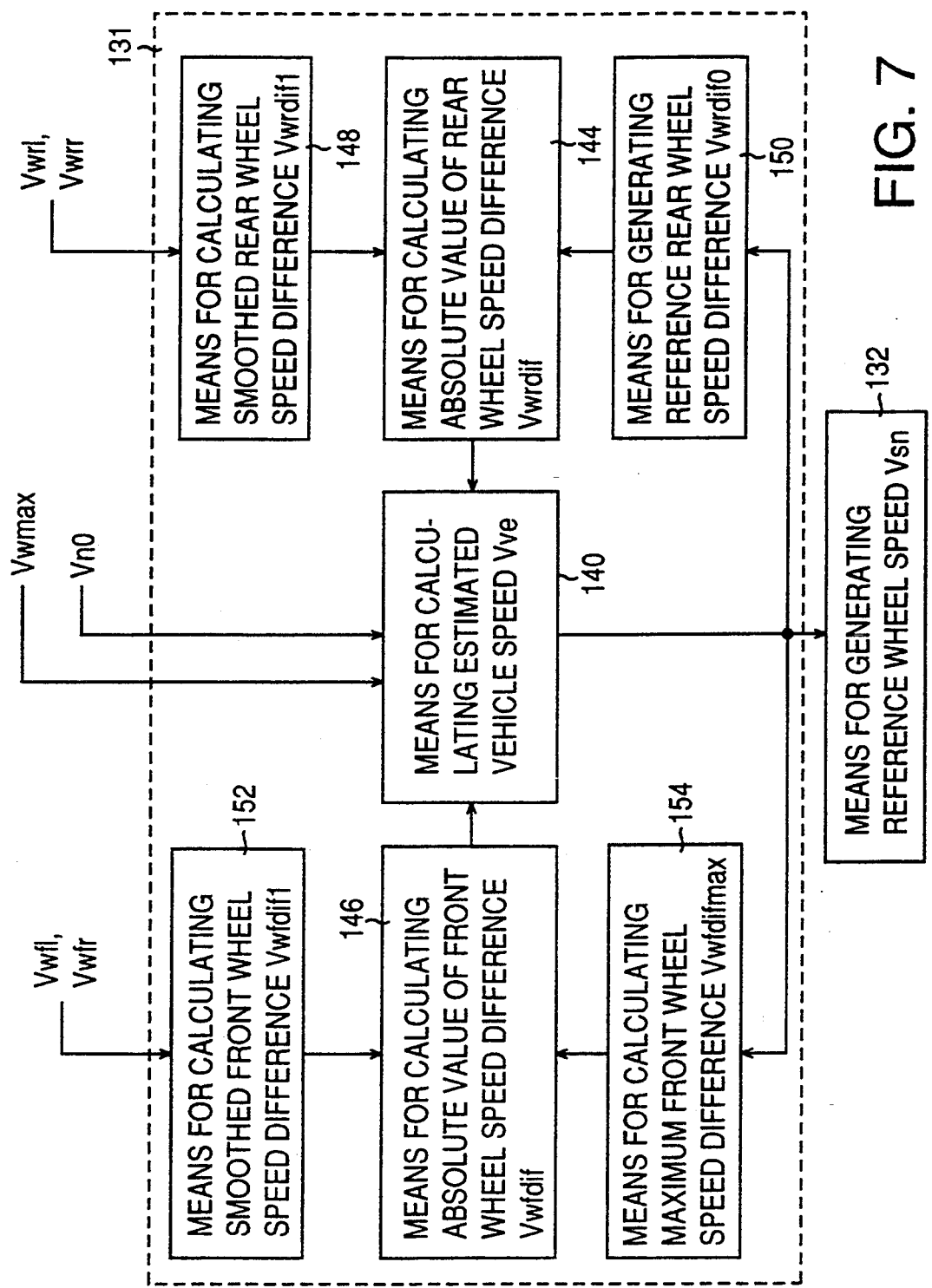
FIG. 7 is a schematic block diagram illustrating a functional arrangement of means 131 of FIG. 3 for generating an estimated vehicle speed.

The generating means 131 has various functional means as illustrated in the block diagram of FIG. 7, which includes calculating means 140 for eventually obtaining the estimated vehicle speed Vve.

The calculating means 140 receives: maximum wheel speed Vwmax obtained by the determining means 126; common disturbance value Vn0 obtained by the calculating means 128; absolute value of a rear wheel speed difference Vwrdif obtained by calculating means 144; and absolute value of a front wheel speed difference Vwfdif obtained by calculating means 146, which difference Vwfdif represents an amount of turning of the vehicle.

As described below in detail, the present embodiment is arranged so that the estimated vehicle speed Vve is lowered with an increase in the common external disturbance value Vn0 (obtained depending upon the amounts of change in the speeds of the four wheels), in order to raise the brake pressures during running of the vehicle on a relatively bad road surface, namely, in order to improve the operating characteristics of the brake system while the road surface condition is relatively bad.

Further, the brake pressure of the brake cylinder 26 or 54 of the non-selected higher-speed rear wheel RL or RR is purposely lowered with respect to the brake pressure for the lower-speed rear wheel, as indicated above, so that the higher-speed rear wheel is used as the speed monitoring wheel. This arrangement causes the rear wheel speed difference Vwrdif to increase with a decrease in the friction coefficient $\mu$ of the road surface. Accordingly, the estimated vehicle speed Vve obtained by the calculating means 140 is raised with an increase in the absolute value $|Vwrdif|$ (rear wheel speed difference), thereby improving the operating characteristics of the brake system when the friction coefficient $\mu$ of the road surface is low.

On the other hand, the use of the speed Vwrl or Vwrr of the higher-speed rear wheel RL or RR may cause early reduction in the brake pressures during turning of the vehicle, resulting in insufficient braking forces applied to the wheels. To avoid this drawback, the degree of turning of the vehicle is detected on the basis of the absolute value |Vwfdif| of the front wheels FL, FR, and the estimated vehicle speed Vve is lowered with an increase in the detected degree of turning of the vehicle.

The calculating means 144 calculates the absolute value of the rear wheel speed difference Vwrdif on the basis of a smoothed rear wheel speed difference Vwrdif1 received from calculating means 148, and a reference rear wheel speed difference Vwrdif0 received from generating means 150.

The calculating means 148 calculates the smoothed rear wheel speed difference Vwrdif1, as indicated below.

```
Tmp = Vwrr − Vwrl − Vwrdif1_{n−1}
IF Tmp > 0 THEN
    Vwrdif1_n = Vwrdif1_{n−1} + MIN(Tmp, Eps1)
ELSE
    Vwrdif1_n = Vwrdif1_{n−1} + MAX(Tmp, −Eps1)
END IF
```

The error value Tmp in the above equations is an error of the rear wheel speed difference (Vwrr−Vwrl) from the smoothed rear wheel speed difference $Vwrdif1_{n-1}$ in the last cycle $n-1$. When the error value Tmp is a positive $Vwrdif1_n$ (obtained in the present cycle n) is calculated by value, the present smoothed rear wheel speed difference adding the last smoothed rear wheel speed difference $Vwrdif1_{n-1}$ to a smaller one of the error value Tmp and a limit value Eps1. When the error value Tmp is zero or a negative value, the present value $Vwrdif1_n$ is calculated by adding the last value $Vwrdif1_{n-1}$ to a larger one of the error value Tmp and a limit value −Eps1. That is, the smoothed rear wheel speed difference Vwrdif1, which is a difference between the speeds of the rear wheels RR and RL, is determined so as to limit a rate of change of the rear wheel speed difference to within the absolute value |Eps1|, irrespective of whether the difference increases or decreases. The limit value Eps1 is 0.07 km/hr, for example.

The generating means 150 generates the reference rear wheel speed difference Vwrdif0, by calculation according to the following equation:

$$Vwrdif0 = Vve \times 0.02 + 0.5$$

where, Vve is the estimated vehicle speed Vve obtained by the calculating means 140 in the last cycle $n-1$.

The generating means 144 generates the absolute value of the rear wheel speed difference Vwrdif, as indicated below, on the basis of the smoothed rear wheel speed difference Vwrdif1 and the reference rear wheel speed difference Vwrdif0 which have been obtained as described above.

```
Tmp = ABS(Vwrdif1) − Vwrdif0 − Vwrdif_{n−1}
IF Tmp > 0 THEN
    Vwrdif_n = Vwrdif_{n−1} + MIN(Tmp, Eps2)
ELSE
    Vwrdif_n = Vwrdif_{n−1} + MAX(Tmp, −Eps2)
END IF
```

The value ABS(Vwrdif1) in the above equation represents an absolute value of the smoothed rear wheel speed difference Vwrdif1, which absolute value is positive irrespective of which one of the speeds of the rear wheels RR and RL is higher. The error value Tmp is an error of a difference between the absolute value of the smoothed rear wheel speed difference Vwrdif1 and the reference rear wheel speed difference Vwrdif0, from the absolute value of the last rear wheel speed difference $Vwrdif_{n-1}$. The absolute value |Vwrdif| represents a difference between the absolute value of the smoothed rear wheel speed difference Vwrdif1 and the reference rear wheel speed difference Vwrdif0. Like the smoothed rear wheel speed difference Vwrdif1, the absolute value of the rear wheel speed difference Vwrdif is determined so that the rate of change of this value Vwrdif does not exceed the limit value |Eps2|, which is 0.07 km/hr, for instance.

The calculating means 146 calculates the absolute value of the front wheel speed difference Vwfdif, on the basis of a smoothed front wheel speed difference Vwfdif1 received from calculating means 152, and a maximum front wheel speed difference Vwrdifmax received from calculating means 154.

The calculating means 152 calculates the smoothed front wheel speed difference Vwfdif1, as indicated below.

```
Tmp = Vwfr − Vwfl − Vwfdif1_{n−1}
IF Tmp > 0 THEN
    Vwfdif1_n = Vwfdif1_{n−1} + MIN(Tmp, Eps3)
ELSE
    Vwfdif1_n = Vwfdif1_{n−1} + MAX(Tmp, −Eps3)
END IF
```

The calculating means 146 calculates the absolute value of the front wheel speed difference Vwfdif according to the following equations:

$$Vwfdif = ABS(Vwfdif1) \times K2$$

$$Vwfdif = MAX(Vwfdif, Vwfdifmax)$$

The value K2 is an adjusting constant selected within a range between 0.5 and 0.75. In the present embodiment, the constant K2 is equal to 0.75. The meaning of this constant K2 will be explained.

If the absolute value of the front wheel speed difference Vwfdif calculated by the calculating means 146 exceeds the maximum front wheel speed difference Vwfdifmax calculated by the calculating means 154, the value Vwfdifmax is used as the absolute value of the front wheel speed difference Vwfdif.

The maximum front wheel speed difference Vwfdifmax is a value which cannot be smaller in theory than the front wheel speed difference Vwfdif, and is calculated according to the following equation:

$$Vwfdifmax = 1.3 \times 0.5 \times 9.8 \times 3.6^2 / Vve$$

The above equation is formulated with the following taken into consideration:

A lateral acceleration Gy of the vehicle, a radius R of turning of the vehicle and the estimated vehicle speed Vve have a relationship $Gy = Vve^2/R$. Further, the turning radius R, the estimated vehicle speed Vve, a distance Ww between the front wheels FL and FR, and the front wheel speed difference Vwfdif have a relationship $Vwfdif = Vve \times Ww/R$. Therefore, an equation $Vwfdif = Ww \times Gy/Vve$ is obtained. It is empirically known that the maximum lateral acceleration Gy of the vehicle during running on a road surface having a sufficiently high friction coefficient $\mu$ is in a range of 0.5–0.6 G. The above equation Vwfdifmax=$1.3\times0.5\times9.8\times3.6^2$/Vve is obtained by substituting 0.5 G and 1.3 m for Gy and Ww, respectively, in the above equation Vwfdif=Ww×Gy/Vve, and expressing Vwfdif (=Vwfdifmax) in unit of km/hr.

The calculating means 140 first obtains the maximum wheel speed Vwmax by limiting the non-processed maximum wheel speed vwxmax as received from the determining means 126, according to the following equations:

$$Vwxmax = Max(Vwfr, Vwfl, Vwrr, Vwrl)$$

$$Tmp = Min(Vwmax_{n-1} + 0.175, Vwxmax)$$

$$Vwmax_n = Min(Vwmax_{n-1} - 0.35, Tmp)$$

As indicated above, the amount of increase in the maximum wheel speed Vwmax during the 5 msec sampling period is limited to 0.175 km/hr, while the amount of decrease in the maximum wheel speed Vwmax during the sampling period is limited to −0.35 km/hr. The limit values 0.175 km/hr and −0.35 km/hr during the 5 msec sampling period are equivalent to 1 G and −2 G, respectively.

Then, a compensated maximum wheel speed Vwmaxc is calculated according to the following equation:

$$Vwmaxc = vwmax - Vn0 + Vwrdif \times K1 - Vwfdif \times K2$$

However, the value (Vwfdif×K2) is used to obtain the compensated maximum wheel speed Vwmaxc only when the absolute value of the front wheel speed difference Vwfdif exceeds a threshold value for more than a predetermined length of time, that is, only when the vehicle is turning.

The compensated maximum wheel speed Vwmaxc decreases with an increase in the common external disturbance value Vn0 (positive value), which is obtained by the calculating means 128 as described above. This arrangement is effective to avoid excessive reduction in the brake pressures during running of the vehicle on a bad road surface.

The value K1 is a value for adjusting the smoothed rear wheel speed difference Vwrdif1, so as to avoid an excessive increase in the brake pressures due to an excessive amount of slip of the higher-speed rear wheel (which is the highest-speed wheel of all the four wheels) when the friction coefficient μ of the road surface is considerably low. In other words, even the highest-speed rear wheel slips on the road surface to a considerable extent if the friction coefficient of the road surface is excessively low. In this case, the amount of slip of that highest-speed rear wheel is not detected and will result in increasing the brake pressures to unnecessarily high levels. To avoid such drawback, the adjusting value K1 is used for reducing the smoothed rear wheel speed difference Vwrdif1. This value K1 is selected within a range of 0.125–0.25. In the present embodiment, the value K1 is set at 0.25.

On the other hand, the value K2 is a value for adjusting the smoothed front wheel speed difference Vwfdif1, with the degree of turning of the vehicle taken into account. In this respect, it is noted that the front wheel speed difference increases with an increase in the angular velocity of the vehicle due to the vehicle turning. The adjusting value K2 is provided to lower the compensated maximum wheel speed Vwmaxc as the absolute value of the front wheel speed difference Vwfdif increases.

Theoretically, the adjusting value K2 for adjusting the front wheel speed difference in relation to the vehicle turning should be 0.5. However, since the rear wheel speed difference is also influenced by the turning of the vehicle, this aspect should be taken into consideration in determining the adjusting value K2. In the present embodiment, the adjusting value K2 is set at (K1+0.5)=0.75, which offsets the adjustment by the adjusting value K1 in connection with the rear wheel speed difference Vwrdif.

It is noted that the individual external disturbance value Vn1 is calculated on the basis of a positive value of the second relative wheel speed change amount ΔVw2, while the common external disturbance value Vn0 is calculated on the basis of a negative value of the second relative wheel speed change amount ΔVw2. According to this arrangement, the maximum wheel speed Vwmaxc compensated by positive feedback does not suffer from oscillation, whereby the response and stability of the compensated maximum wheel speed Vwmaxc are improved.

In view of the fact that the vehicle turning has an influence on the rear wheel speed difference, it is possible to adjust the absolute value of the rear wheel speed difference Vwrdif depending upon the degree of the vehicle turning, rather than the front wheel speed difference. However, it is noted that one of the right and left rear wheels which is on the inner side with respect to the turning path of the vehicle has the smallest load, and consequently tends to have a comparatively large amount of slip. This means that the front wheel speed difference reflects the angular velocity of the vehicle more accurately than the rear wheel speed difference during turning of the vehicle. For this reason, the front wheel speed difference Vwfdif is adjusted by the adjusting value K2 depending upon the angular velocity.

The generating means 131 calculates the estimated vehicle speed Vve on the basis of the thus compensated maximum wheel speed Vwmaxc. More precisely, an amount of change ΔVve of the estimated vehicle speed is obtained as a first integral of an error Error between the compensated Vwmaxc and the estimated vehicle speed Vve, and the estimated vehicle speed Vve is obtained as a second integral of the error value Error.

The first integral ΔVve (amount of change of the estimated vehicle speed during the sampling period=cycle time CYCT) is proportional to the friction coefficient μ between the road surface and the tires of the wheels, if the brake pressures for the wheels are properly controlled. Where the road surface condition is almost constant, the amount of change ΔVve is expected to be almost constant. In this sense, it is desirable that the amount of change ΔVve be moderately or slowly adjusted.

During an initial period immediately after commencement of brake pressure regulation, or when the friction coefficient μ of the road surface changes from a relatively high value to a relatively low value, it is desirable that the amount of change ΔVve be adjusted at a sufficiently early point of time with respect to the rate of change of the friction coefficient.

In view of the above desirability, the amount of change ΔVve is calculated in the following manner, which assures freedom of the calculated amount of change ΔVve from the error Error between the compensated wheel speed Vwmaxc and the estimated vehicle speed Vve, so that the amount of change ΔVve is responsive to a decrease in the friction coefficient μ within a time period of 0.25–0.5 sec, and to an increase in the friction coefficient μ within a time period of 0.5–0.75 sec.

```
Vvex = Vve_{n-1} + ΔVve_{n-1}
Error = Vwmaxc - Vvex
IF Error > 0 THEN
    Tmp = Eps4u
    IF Vwrdif > 1.5 THEN Tmp = Tmp × 4
    IF JIKAN < 0 THEN JIKAN = 0
    JIKAN = JIKAN + 1
    IF JIKAN > 20 THEN Tmp = Tmp × 2
ELSE
    Tmp = Eps4d
    IF Vwrdif < -0.75 THEN Tmp = Tmp × 2
    IF JIKAN > 0 THEN JIKAN = 0
    JIKAN = JIKAN - 1
    IF JIKAN < -20 THEN Tmp = Tmp × 4
END IF
ΔVve_n = ΔVve_{n-1} + Tmp/200
Vve_n = Vvex + Tmp/16
```
where, Eps4u=0.4, Eps4d=−0.2

In the present embodiment, the portion of the computer 82 assigned to implement the above calculation serves as a filter for filtering the estimated vehicle speed Vve.

The above method of calculation is an improvement over the basic second-order delay type smoothing method indicated below.

```
Vvex = Vve_{n-1} + ΔVve_{n-1}
Error = Vwmaxc - Vvex
IF Error > 0 THEN
    Tmp = Eps4u
ELSE
    Tmp = Eps4d
END IF
ΔVve_n = ΔVve_{n-1} + Tmp/200
Vve_n = Vvex + Tmp/16
```

The value Eps4u and Eps4d are set at 0.4 and −0.2, respectively, so that the estimated vehicle speed Vve deals with a decrease in the friction coefficient μ more quickly than an increase in the friction coefficient μ.

According to the above basic second-order delay type smoothing method, the amount of change ΔVve of the estimated vehicle speed immediately after the commencement of anti-lock regulation of the brake pressures is initially set at a value corresponding to a sufficiently high value (preferably higher than 0.6, more preferably higher than 0.8, and most preferably almost 1.0) of the friction coefficient μ, so as to eliminate a response delay of the estimated vehicle speed Vve with respect to an increase in the friction coefficient. However, the method suffers from a problem of excessive amounts of slip of the wheels immediately after the commencement of anti-lock regulation of the brake pressures when the friction coefficient μ is relatively low. In the present embodiment, this problem is solved by introducing the absolute value of the rear wheel speed difference Vwrdif so that the estimated vehicle speed Vve is more responsive to a decrease in the friction coefficient.

Normally, the above solution permits adequate determination of the estimated vehicle speed Vve. When the absolute value of the rear wheel speed difference Vwrdif is extremely large or small, the calculated estimated vehicle speed Vve is not sufficiently responsive to a change in the rear wheel speed difference, leading to unsatisfactory accuracy of anti-lock regulation of the brake pressures. In the light of this drawback, it was proposed to improve the manner of determining the estimated vehicle speed Vve, by introducing values Tmp×4 and Tmp×2 as learning amounts for increased response of the estimated vehicle speed Vve, as indicated below.

```
Vvex = Vve_{n-1} + ΔVve_{n-1}
Error = Vwmaxc - Vvex
IF Error > 0 THEN
    Tmp = Eps4u
    IF Vwrdif > 1.5 THEN Tmp = Tmp × 4
ELSE
    Tmp = Eps4d
    IF Vwrdif < -0.75 THEN Tmp = Tmp × 2
END IF
ΔVve_n = ΔVve_{n-1} + Tmp/200
Vve_n = Vvex + Tmp/16
``` where, Eps4U=0.4, Eps4d=−0.2

However, a further study revealed that the above manner of calculation of the estimated vehicle speed Vve is still unsatisfactory in its response, due to retention of the error value Error of the same sign (error in the same direction) for a considerably long time, causing deterioration of accuracy of the anti-lock brake pressure regulation.

To overcome the above drawback, the present embodiment uses a large learning amount Tmp×8 to improve the response of the estimated vehicle speed Vve, irrespective of an increase or a decrease in the friction coefficient μ, if the error value Error of the same sign is retained for more than a predetermined time 100 msec (=20×cycle time CYCT of 5 msec), as indicated above.

The estimated vehicle speed Vve thus generated by the generating means 131 is used by the generating means 132 for calculating the reference wheel speed Vsn according to the following equation:

$$Vsn = Vve - Ssn$$

where, Ssn represents a reference slip amount of the wheels and is calculated according to the following equation:

$$Ssn = A \times Vve + B$$

It will be understood from the above equation that the value Ssn is proportional to the estimated vehicle speed Vve.

The thus obtained reference wheel speed Vsn is used for the front wheel FL or FR which is on the outer side with respect to the turning path of the vehicle. It is noted that the reference wheel speed Vsn is not necessary for the outer rear wheel RL or RR, because this rear wheel is the non-selected higher-speed rear wheel which serves as the speed monitoring wheel as described above. For the inner front and rear wheels, however, the reference wheel speed Vsn as calculated according to the above equation Vsn=Vve−Ssn is modified according to the following equation:

$$vsn = Vsn - Vwfdif \times K3$$

where, K3: compensating coefficient

While the constant K3 is theoretically 0.5, it is selected within a range of 0.25–0.375, since the use of the value 0.5 for the constant K3 tends to cause an oscillatory phenomenon. In the present embodiment, the constant K3 is set at 0.25.

It will be understood from the foregoing description of the present embodiment wherein the constants K1, K2 and K3 are set at 0.25, 0.75 and 0.25, respectively, that the reference wheel speed Vsn (estimated vehicle speed Vve) is adjusted with respect to the maximum wheel speed Vwmax, by an amount corresponding to ½ of the distance Ww between the right and left wheels, for the front wheel on the outer side of the vehicle turning path, and by an amount corresponding to ¾ of the distance Ww, for the front and rear wheels on the inner side of the turning path. However, the constants K1, K2 and K3 may be modified as needed, for example, set at 0.25, 0.625 and 0.5, respectively, so that the reference wheel speed Vsn is adjusted with respect to the maximum wheel speed Vwmax, by an amount corresponding to ⅜ of the distance Ww for the outer front wheel, and by an amount corresponding to ⅝ of the distance Ww for the inner front and rear wheels.

Although the above adjustment is theoretically unnecessary for the outer wheels, the present embodiment is adapted to make the adjustment for the outer front wheel, so as to obtain the estimated vehicle speed slightly lower than the optimum level, for controlling the brake pressures for the front wheels to be slightly higher than actually required, and control the brake pressures for the rear wheels in the so-called "selectro-control fashion", that is, control the brake pressure for the outer rear wheel (higher-speed rear wheel or speed monitoring wheel) in the same manner as the inner rear wheel (selected lower-speed rear wheel), so that the controlled brake pressures for the rear wheels are comparatively lower than the optimum level.

Thus, by suitably determining the adjusting constants K1, K2, K3, the brake pressures for the wheels can be regulated so as to cope with both a change (in particular, a decrease) in the friction coefficient $\mu$ of the road surface and turning of the vehicle (a change in the angular velocity of the vehicle). The present embodiment eliminates the conventionally required means for and steps of detecting the friction coefficient $\mu$ below a given lower limit and the angular velocity above a given upper limit, so as to suitably change the mode of controlling the brake pressures depending upon the friction coefficient and the angular velocity of the vehicle. The conventional control arrangement requires complicated control logics for changing the control mode, and suffers from unstable control and fluctuation of the brake pressures upon changing of the control mode. The present embodiment is free from these conventional drawbacks.

Conventionally, the reference wheel speed Vsn is calculated from the estimated vehicle speed Vve which is obtained by limiting the rate of change of the non-processed maximum wheel speed. In calculating the reference wheel speed Vsn, the disturbance value determined from the occurrence frequency of abnormality in the wheel acceleration is compared with a threshold value which is changed in steps, so that the slip amount of the wheel is adjusted in steps. In the present embodiment, on the other hand, the estimated vehicle speed Vve is adjusted on the basis of the common external disturbance value Vn, and the absolute values of the rear wheel speed difference Vwrdif and the front wheel speed difference Vwfdif, before the estimated vehicle speed Vve is filtered into the reference wheel speed Vsn. The pre-filtered estimated vehicle speed Vve is used for all the four wheels, while the post-filtered estimated vehicle speed Vve, namely, the reference wheel speed Vsn is used for only the inner front and rear wheels. The present arrangement wherein the adjustment is sufficiently delayed is effective to reduce the tendency of oscillation of the brake pressures when the amount of adjustment of the estimated vehicle speed is large.

While the above description is given on the assumption that the four wheels have the same tire diameter, the tire diameters of the individual wheels may be actually different from each other. In this respect, it is desirable that the reference wheel speed Vsn for each wheel be adjusted depending upon the tire diameter of the wheel, which may be obtained from a difference of the speed of that wheel from the speeds of the other wheels when no brake is applied to the vehicle.

There will next be described the manner of calculation of the estimated overshoot drop amount Vprev of each wheel speed. The overshoot drop amount Vprev of the wheel speed is an amount of drop of the wheel speed due to 5 control overshoot, which occurs after commencement of reduction or decrease in the brake pressure.

The calculating means 134 calculates the estimated wheel speed drop amount Vprev due to the overshoot, upon commencement of reduction in the brake pressure for each wheel, on the basis of a parameter or parameters relating to or indicative of the road surface condition, for example, on the basis of the brake pressure and the time duration of the brake pressure decrease, or the friction coefficient $\mu$ of the road surface, or the friction coefficient $\mu$ and an external disturbance value or values. The thus calculated estimated overshoot drop amount Vprev is thereafter gradually reduced as the time passes.

In the calculating means 134, the estimated overshoot drop amount Vprev of the speed of each wheel is initially calculated according to the following equation, on the basis of the friction coefficient $\mu$ of a dry asphalt road surface as a standard road surface, and the common external disturbance value Vn0 calculated by the calculating means 128.

Upon commencement of initial or subsequent brake pressure decrease:

$$Vprev_n = Vprev_{n-1} \times 0.5 + 2.5 + Vn0 \times 0.25$$

After the commencement of brake pressure decrease:

$$VPrev_n = Vprev_{n-1} \times (1 - 1/16) - 0.1$$

The calculating means 134 receives the common external disturbance value Vn0 from the calculating means 130 (although this is not shown in the block diagram of FIG. 3.), so that the estimated overshoot drop amount Vprev increases with an increase in the disturbance value Vn0.

Figure 8:
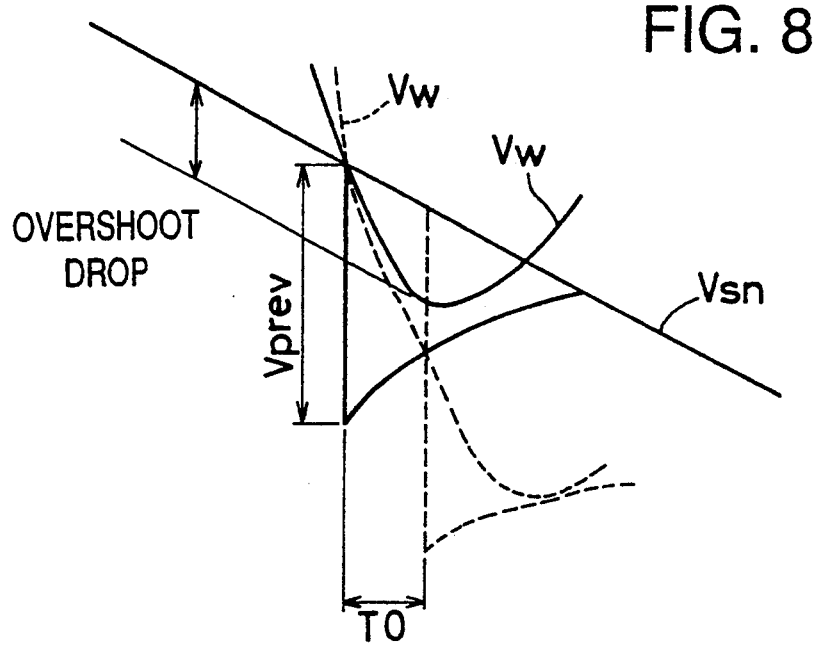
FIG. 8 is a graph for explaining calculation of estimated overshoot drop amount Prev of wheel speed by means 134 of FIG. 3.

As discussed below, the reduction or decrease in the brake pressure for each wheel is commenced, in principle, when the speed Vw of the wheel falls below the reference wheel speed Vsn. However, the wheel speed Vw continues to drop due to the control overshoot, even after the commencement of decrease in the brake pressure in the brake cylinder 26, 36, 46, 54, as indicated in FIG. 8. A given time after the commencement of the brake pressure decrease, the wheel speed Vw begins to rise. The amount of the overshoot drop of the wheel speed varies depending upon the specific braking condition. To cope with this variation, the conventional brake system is adapted to utilize the wheel acceleration (deceleration) value in determining the point of time at which the brake pressure decrease is terminated or the subsequent brake pressure increase is commenced. But, the wheel acceleration is easily affected by the external disturbance, and the conventional arrangement inevitably suffers from insufficient accuracy of control of the brake pressure, when the external disturbance is considerably large. If the wheel speed and the wheel acceleration are both utilized to determine the point of termination of the brake pressure decrease, the brake system requires complicated control logics.

In the light of the above drawback experienced in the prior art, the wheel acceleration is replaced by the estimated overshoot drop amount Vprev, and a critical wheel speed (Vsn−Vprev) is obtained and used in determining whether the brake pressure should be further decreased, or should alternatively be increased. As indicated in FIG. 8, the estimated overshoot drop amount Vprev (positive value) is calculated upon commencement of the brake pressure decrease (when the wheel speed Vw falls below the reference wheel speed Vsn), and the value Vprev is subsequently gradually reduced from the initial value.

Since the estimated overshoot drop amount Vprev is used as a parameter reflecting the tendency of an eventual rise of the wheel speed up toward the reference wheel speed Vsn after the commencement of the brake pressure decrease, it is desirable that the overshoot drop amount Vprev change almost following the actual wheel speed Vw, that is, the curve of the value Vprev is close to and substantially follows the curve of the wheel speed Vw. In practice, however, it is suffice that the curve of the estimated overshoot drop amount Vprev lies generally below the expected curve of the actual wheel speed Vw which is lower than the reference wheel speed Vsn.

In view of the above need, the present embodiment is adapted to initially set the estimated overshoot drop amount Vprev to a considerably large value upon commencement of the brake pressure decrease, and thereafter gradually reduce the amount Vprev, as indicated in FIG. 8. The curve Prev approximating the convex curve Vw takes the form of a sawtooth which represents an estimated initial overshoot drop of the wheel speed upon commencement of a brake pressure decrease, and an estimated gradual rise of the wheel speed as the time passes after the initial overshoot drop. The overshoot drop amount Vprev of the wheel speed is represented by the distance between the sawtooth curve Prev and a line representative of the reference wheel speed Vsn, as indicated in FIG. 8. Although this is a simple arrangement to satisfy the above need, the method of setting the overshoot drop amount Vprev is not limited to the specific form illustrated in FIG. 8, but may be modified as needed. For instance, the gradual reduction of the amount Vprev may take other forms, and may be preceded by an initial gradual increase for a suitable time period after the commencement of the brake pressure decrease.

Each brake pressure decrease is effected for a predetermined constant time period T0. Upon termination of the brake pressure decrease or expiration of the predetermined time period T0, the detected wheel speed Vw (more precisely, near future wheel speed Vwf which will be described in detail) is compared with the critical wheel speed (Vsn−Vprev). If the wheel speed Vw is higher than the critical wheel speed (Vsn−Vprev) as indicated in solid lines in FIG. 8, then an increase in the brake pressure is commenced. If the wheel speed Vw further drops below the critical wheel speed (Vsn−Vprev) as indicated in dashed lines in FIG. 8, on the other hand, another brake pressure decrease is commenced, with the overshoot drop amount Vprev being updated. This brake pressure decrease is referred to as "subsequent brake pressure decrease". The subsequent brake pressure decrease is repeated until the wheel speed Vw rises above the critical wheel speed (Vsn−Vprev). Thus, a suitable number of repetition of the brake pressure decrease cycles are effected to achieve anti-lock regulation of the brake pressure to an optimum level depending upon the specific braking condition.

Figure 9:
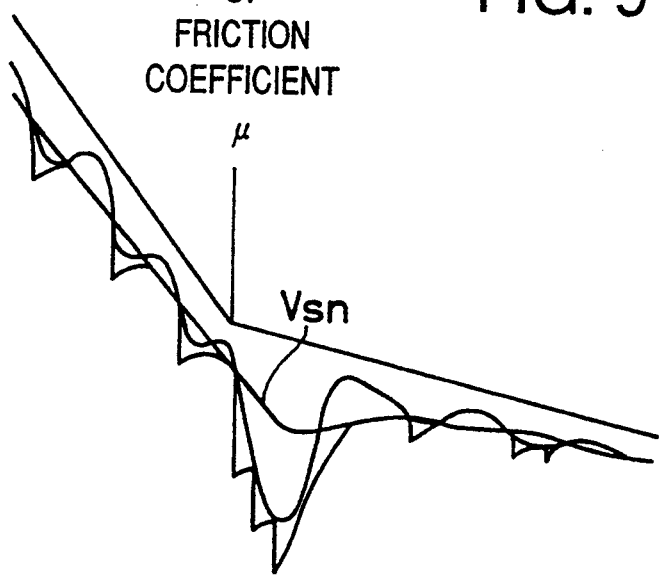
FIG. 9 is a graph showing changes in the actual wheel speed Vw, reference wheel speed Vsn and estimated wheel speed overshoot drop amount Vprev upon abrupt change in friction coefficient $\mu$ of road surface during an operation of the brake system to regulate the brake pressure.

If the friction coefficient $\mu$ of the road surface is suddenly lowered during brake application to the vehicle, the actual wheel speed Vw is considerably lowered due to a relatively large amount of overshoot drop, with respect to the critical wheel speed (Vsn−Vprev), and the brake pressure decrease cycle is repeated a suitable number of times, as indicated in FIG. 9, whereby the brake pressure is lowered sufficiently to a level that meets the lowed friction coefficient $\mu$.

If the present brake pressure regulation using the estimated overshoot drop amount Vprev or the critical wheel speed (Vsn−Vprev) is effected together with the well known technique wherein the brake pressure is held for a suitable time between the adjacent pressure decrease cycles, the brake pressure can be adequately controlled even during a vehicle running on a bad road surface having a relatively high friction coefficient $\mu$.

While the above description relates to the anti-lock brake pressure regulation in a tentative case wherein no external disturbances exist, the external disturbances which actually exist to some extent may lower the actual wheel speed Vw to a level lower than the critical wheel speed (Vsn−Vprev). In this case, the brake pressure is unnecessarily lowered due to the subsequent pressure decrease cycle or cycles. In view of this drawback, the initial estimated overshoot drop amount Vprev for the initial brake pressure decrease is determined so as to increase with an increase in the common external disturbance value Vn0.

The generating means 122 calculates a present speed error Hensa of each of the front wheels FL, FR and selected lower-speed rear wheel RL or RR, on the basis of the thus obtained critical wheel speed (Vsn−Vprev), the individual external disturbance values Vn1, and the wheel speed Vw and its first and second relative wheel speed change amounts $\Delta$Vw1 and $\Delta$Vw2 which have been calculated by the calculating means 120 as described above. The wheel speed error Hensa is used to determine whether an initial brake pressure decrease should be commenced.

Theoretically, the wheel speed error Hensa can be obtained by subtracting the critical wheel speed (Vsn−Vprev) from the wheel speed Vw as adjusted by the external disturbance value Vn1. In the present embodiment, however, the wheel speed error Hensa is calculated in the following manner.

To begin with, a first error value Hensa1 is calculated according to the following equations, on the basis of the wheel speed Vw, external disturbance value Vn1, and critical wheel speed (Vsn−Vprev):

$$Hensa1 = (Vw + Vn1) - (Vsn - Vprev)$$

$$Hensa1 = MIN(Hensa1, Limit)$$

Then, a second error value Hensa2 is calculated according to the following equations, on the basis of the first error value Hensa1, first relative wheel speed change amount $\Delta Vw1$, and external disturbance value Vn1:

```
Hensa2 = Hensa1 + ΔVw1 × 4
IF ΔVw1 > 0 AND ΔVw2 > 0 THEN
    Hensa2 = Hensa 2 + ΔVw2
Hensa2 = Max(Hensa2, 0)
```

Finally, the wheel speed error Hensa is calculated according to the following equation, on the basis of the thus calculated first and second wheel speed errors Hensa1 and Hensa2:

$$Hensa = MAX\{Hensa1, (Hensa1 + Hensa2)/2\}$$

According to the above calculation, the first relative wheel speed change amount $\Delta Vw1$ serves to reduce the wheel speed error Hensa immediately before commencement of an initial brake pressure decrease, for thereby starting the brake pressure decrease at a relatively early point of time, while the estimated overshoot drop amount Vprev serves to increase the wheel speed error Hensa after termination of the brake pressure decrease, thereby making it difficult for a subsequent brake pressure decrease to take place. Further, the second relative wheel speed change amount $\Delta Vw2$ serves to inhibit a decrease in the brake pressure after the wheel speed Vw rises above the critical point (Vsn−Vprev).

The ABS actuator 78 of the anti-lock brake system may be a three-mode type having a pressure-increase mode, a pressure-hold mode and a pressure-decrease mode, or a rapid/slow increase type in which the brake pressure may be increased either rapidly or slowly. Where the brake system is provided with such type of ABS actuator, the positive value of the wheel speed error Hensa may be used to increase the brake pressure at a rate which increases with the value of the wheel speed error Hensa.

The reference wheel speed if obtained by adding the wheel acceleration component (amount of change of the wheel speed) to the wheel speed is undesirably influenced by external disturbances due to a bad road surface condition. However, it was found out that the brake system would be capable of suitably dealing with both good and bad conditions of the road surface if the wheel acceleration component (first and second amounts of change $\Delta Vw1$, $\Delta Vw2$ of the relative wheel speed Vwv) is compressed as the road surface condition deteriorates.

It was found that since the second relative wheel speed change amount $\Delta Vw2$ is equivalent to an integral of the last eight values of the first relative wheel speed change amount $\Delta Vw1$, the substitution of $\Delta Vw2/2$ for $\Delta Vw1 \times 4$ is effective to suitably deal with a bad road surface condition, but unfavorably results in inaccurate control of the brake pressures for a good surface condition. This means that weighting the first and second relative wheel speed change amounts $\Delta Vw1$ and $\Delta Vw2$ as needed improves the accuracy of control of the brake pressures. In other words, the accuracy or adequacy of the anti-lock brake pressure control can be improved by using as a control parameter a future wheel speed error Hensaf which is obtained from the first and second relative wheel speed change amounts $\Delta Vw1$ and $\Delta Vw2$.

In the present embodiment, the future wheel speed error Hensaf is calculated according to the following equation, on the basis of the individual external disturbance value Vn1 and the second relative wheel speed change amount $\Delta Vw2$:

$$Hensaf = Hensa + (\Delta Vw2 + Vn1) \times 20 \text{ msec}/40 \text{ msec}$$

Figure 10:
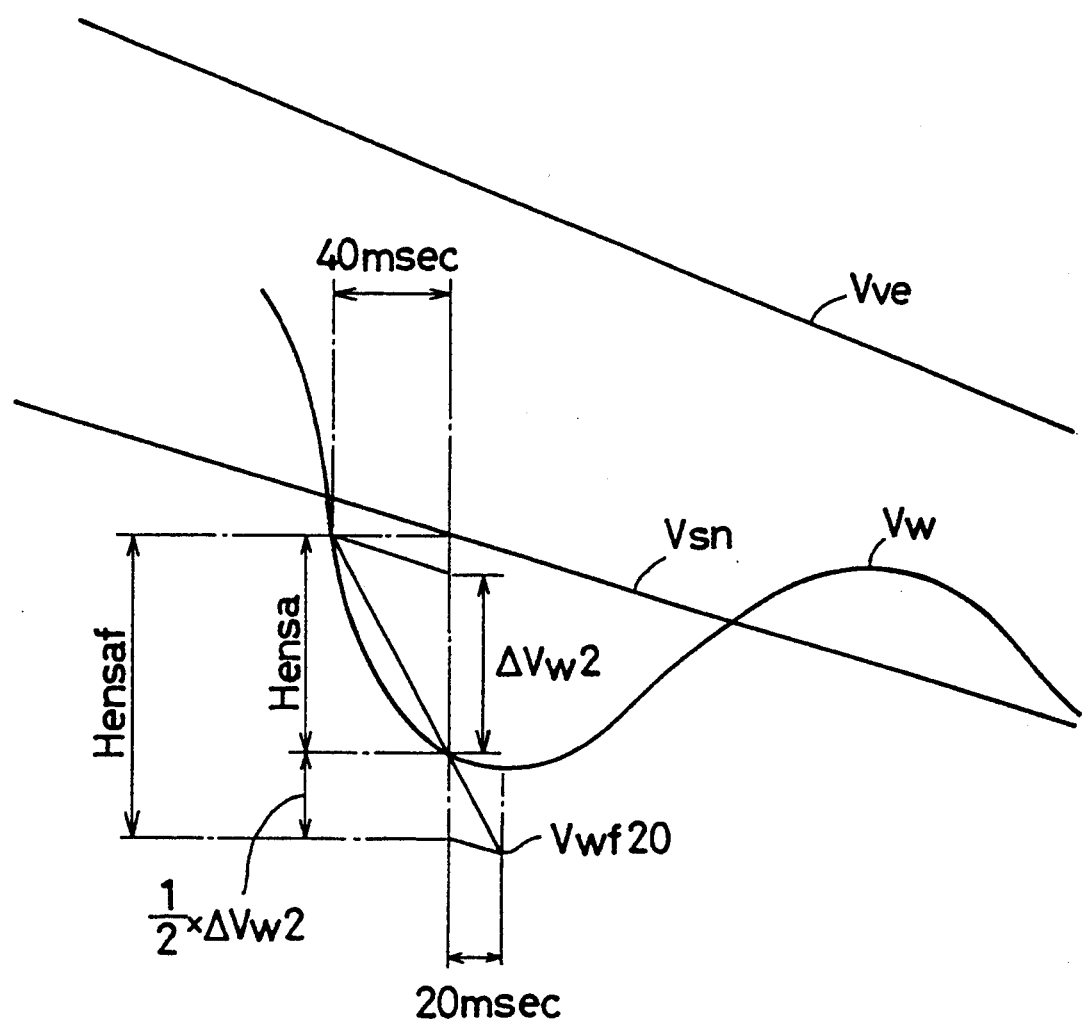
FIG. 10 is a graph for explaining a future wheel speed error "Hensaf" generated by means 122 of FIG. 3.

Since the second relative wheel speed change amount $\Delta Vw2$ is an amount of change of the relative wheel speed Vvw with respect to the reference wheel speed Vsn, as explained above, the future wheel speed error Hensaf is a sum of the wheel speed error Hensa and an estimated amount of change $\Delta Vw2/2$ of the wheel speed Vw (relative to the reference wheel speed Vsn) during a future period of 20 msec, as indicated in the graph of FIG. 10.

Then, the final value of the future wheel speed error Hensaf is obtained according to the following equation:

$$Hensaf = MAX(Hensa, Hensaf)$$

According to the above equation, the wheel speed error Hensa is used as the future wheel speed error Hensaf if the calculated value Hensaf is smaller than the wheel speed error Hensa. The final value of the future wheel speed error Hensaf is used to determine the point of time at which a subsequent brake pressure decrease or a brake pressure increase is commenced.

The above arrangement makes it possible to shorten the required braking distance of the vehicle, by retarding the brake pressure decrease and advancing the brake pressure increase so as to assure a sufficient brake force to be exerted on the wheel.

On the basis of the wheel speed error Hensa and the future wheel speed error Hensaf, and the data indicative of the selected lower-speed wheel RL or RR received from the determining means 124, the determining means 136 determines the point of time at which the brake pressure decrease or increase is commenced.

In principle, an initial or first brake pressure decrease is commenced when the wheel speed error Hensa becomes negative. The brake pressure decrease continues for the predetermined time duration T0. If the future wheel speed error Hensaf remains negative upon expiration of the time T0, another or subsequent brake pressure decrease cycle is effected. If the value Hensaf at that moment has been raised to a positive value within the time duration T0, a brake pressure increase cycle is commenced.

As the time duration T0 is determined assuming that the road surface has a relatively high friction coefficient $\mu$, the initial or first brake pressure decrease where the friction coefficient is relatively high results in a sufficient amount of rise of the wheel speed after the overshoot drop, leading to a positive value of the future wheel speed error Hensaf. Where the friction coefficient is relatively low, on the other hand, the initial brake pressure decrease may be insufficient for the future wheel speed error Hensaf to become positive, namely, the value Hensaf remains negative, whereby a subsequent brake pressure decrease is effected. Thus, a suitable number of brake pressure decrease cycles are repeatedly implemented each for the predetermined time duration T0, where the friction coefficient is relatively low, so that the total amount of brake pressure decrease is sufficient to deal with the relatively low friction coefficient.

The points of time at which the brake pressure decrease or increase for the front wheels FL, FR is commenced are determined independently of each other. For the rear wheels RL, RR, however, the points of time of commencement of the brake pressure decrease or increase are determined in the so-called "selectro-control fashion", in which the points of time are determined on the values Hensa and Hensaf of the selected lower-speed rear wheel RL or RR which is supposed to have a large amount of slip on the road surface. But, the points of time at which the brake pressure decrease for the rear wheels RL, RR is terminated are made different. More specifically, the point of time at which the brake pressure decrease for the non-selected higher-speed rear wheel (i.e., speed monitoring wheel discussed above) is terminated is delayed by a predetermined short time length (e.g., 1-2 msec) with respect to that for the lower-speed rear wheel, so that the brake pressure for the speed monitoring rear wheel is made lower than that for the other or lower-speed rear wheel, in an attempt to purposely cause the speed monitoring wheel to have the maximum wheel speed Vwmax close to the actual wheel speed.

Figure 11:
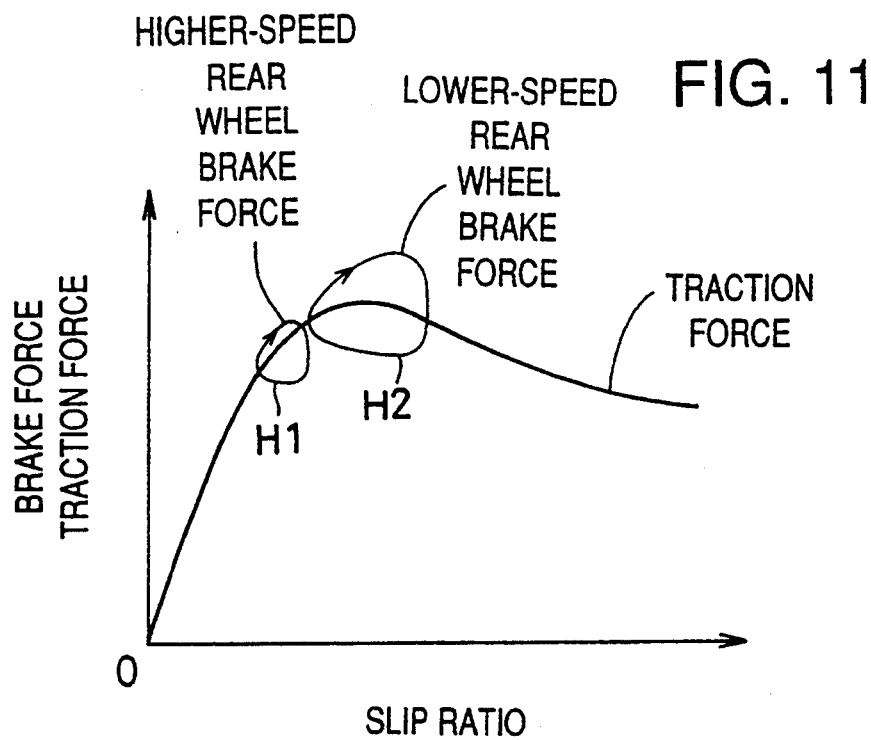
FIG. 11 is a graph indicating an operation to control the slip ratio of the rear wheels of the vehicle in the brake system of FIG. 1.

As indicated above, one of the rear wheels RL and RR which has a lower speed is used as the selected rear wheel whose values Hensa and Hensaf are used for determining the points of time of commencement of the brake pressure decrease and increase, and the other rear wheel having a higher speed is used as the speed monitoring wheel. As a result, the brake force of the speed monitoring wheel is controlled as indicated by a closed loop H1 in FIG. 11, while that of the selected lower-speed rear wheel is controlled as indicated by a closed loop H2 in FIG. 11.

Figure 12:
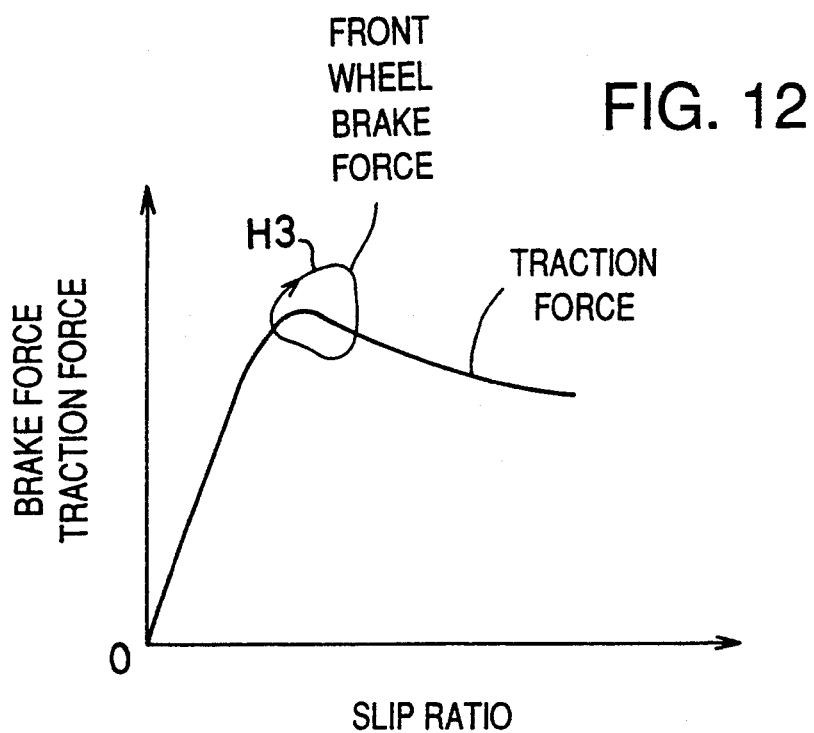
FIG. 12 is a graph indicating an operation to control the slip ratio of the front wheels in the brake system of FIG. 1.

On the other hand, the brake forces of the front wheels FL, FR are controlled as indicated by a closed loop H3 in FIG. 12, so that the accuracy of control of the brake pressures is improved to reduce an amount of variation in the slip amount of the front wheels, thereby effectively shortening the required braking distance of the vehicle.

It will be understood from the foregoing description of the present embodiment of this invention that the wheel speed sensors 100, 102, 104, 106, and the calculating means 120 of the electronic control device 80 assigned to process the output signals of those wheel speed sensors constitute means for obtaining the speeds of the wheels. Further, the determining means 126, calculating means 128 and 130 and generating means 131 constitute means for obtaining the vehicle speed, while the calculating means 120 also serves as means for obtaining the first and second relative wheel speed changes ΔVw1 (or ΔVwx1) and ΔVw2. It is also noted that the generating means 122 and 132, determining means 136 and the ABS actuator 78 constitute pressure regulating means for regulating the brake pressures in the wheel brake cylinders 26, 36, 46, 54.

In the present embodiment, the common external disturbance value Vn0, individual external disturbance values Vn1, and absolute values of the front wheel speed difference Vwfdif and rear wheel speed difference Vwrdif are used to calculate the wheel speed error Hensa and the future wheel speed error Hensaf, so that the brake pressures are suitably controlled depending upon the friction coefficient $\mu$ and waviness or bumpiness of the road surface, degree of turning of the vehicle and other running conditions of the vehicle. The value Vn0 and the other parameters used for obtaining the values Hensa and Hensaf are all continuously variable, contrary to the conventionally used control parameters which change in steps depending upon the running conditions of the vehicle indicated above. Accordingly, the arrangement according to the present embodiment is capable of avoiding a considerable control error which would arise from a non-continuous step-up or step-down change of the control parameters. In this respect, too, the present brake system assures improved accuracy of anti-lock brake pressure control.

It will also be understood that the common external disturbance value Vn0, for example, may be used for compensating any one of the maximum wheel speed Vwmax, estimated wheel speed Vve, reference wheel speed Vsn and wheel speed error Hensa, with substantially the same result obtained by the compensation. Therefore, there is a large degree of freedom in determining the process steps in which the above-indicated values are used. In this respect, the timing of use of those values is not limited to that of the illustrated embodiment.

Moreover, the present embodiment permits highly accurate regulation of the brake pressures by a rapid decrease and a slow increase of the pressure, which is conventionally considered difficult during running of the vehicle on the road surface having a comparatively low friction coefficient $\mu$ or at a comparatively low speed. That is, the conventional difficulty is overcome by the following features: suitably smoothing the wheel speed Vw and estimated vehicle speed Vve; calculating the estimated wheel speed Vext by extrapolation; introducing the overshoot drop amount Prev of the wheel speed (critical wheel speed Vsn−Vprev); and introducing the near future wheel speed Vwf, as well as by giving different roles to the rear left and right wheels RL, RR and determining the reference wheel speed Vsn on the basis of the continuously variable control values.

Any one of the above features may be used alone, or the features may be used in combination. In any case, an appropriate advantage may be obtained.

In the illustrated embodiment, each of the four wheels FL, FR, RL, RR is provided with two solenoid-operated valves for increasing and decreasing the brake pressure. However, other valve arrangements are possible for controlling the brake pressures for the wheels. For instance, each wheel may be provided with a solenoid-operated directional control valve having a pressure-increase position, a pressure-hold position and a pressure-decrease position, or a combination of a solenoid-operated valve having a pressure-increase position and a pressure-decrease position and a flow control valve.

Although the illustrated embodiment is adapted for use on an FF vehicle (front-engine front-drive vehicle), the principle of the present invention is equally applicable to an FR vehicle (front-engine rear-drive vehicle) and a 4-WD vehicle (four-wheel-drive vehicle). When the present invention is applied to a brake system for the FR or 4-WD vehicle, suitable modifications should be made so as to meet the specific operating condition of the vehicle, namely, application of drive forces to the rear wheels on the FR vehicle, and application of drive forces to all the four wheels and mutual influences of the speeds of the four wheels through a differential gear on the 4-WD vehicle.

In the illustrated embodiment, each wheel speed sensor includes a rotor having multiple teeth equally spaced from each other along a circle, and an electromagnetic pick-up which is opposed to the teeth of the rotor and adapted to electromagnetically detect the passage of each tooth of the rotor. The AC output signal of the electromagnetic pick-up is processed to calculate the average wheel speed in the form of non-processed wheel speed Vxa on the basis of a time interval between two intermediate points each of which is intermediate between adjacent two points at which the level of the output signal rises above and falls below a threshold value, namely, intermediate between adjacent two zero-crossing points which define the width of each tooth of the rotor or each groove between adjacent two teeth of the rotor. The non-processed estimated wheel speed Vext at the present sampling point is calculated on the basis of a plurality of successive values of the non-processed wheel speed Vxa which have been obtained prior to the present sampling point.

The wheel speed sensor including the teethed rotor and the electromagnetic pick-up as described above is widely used. In this connection, it is noted that the time interval between a pair of zero-crossing points of the output signal of the electromagnetic pick-up is not necessarily the same as that between the adjacent pair of zero-crossing points. In other words, the time interval between the zero-crossing points corresponding to the opposite edges of a tooth of the rotor usually differs from that between the zero-crossing points corresponding to the opposite edges of a groove of the rotor. Further, these time intervals may vary due to eccentricity of the rotor with respect to the pick-up. However, the time interval (indicated at DVT in FIG. 5) between two points each intermediate between the edges of a tooth or a groove of the rotor is constant, irrespective of a difference between the time interval corresponding to the width of the rotor tooth and the time interval corresponding to the width of the rotor groove, as long as the wheel (rotor attached to the wheel) is rotating at a constant speed. Accordingly, the present embodiment assures high accuracy of calculation of the average wheel speed or non-processed wheel speed Vxa and the estimated wheel speed Vext at the present sampling point.

If the time interval between any pair of adjacent zero-crossing points of the AC output signal of the wheel speed sensor is considered to be constant, the average wheel speed Vxa may be obtained based on the time interval between these adjacent zero-crossing points. If the actual wheel speed linearly changes, the calculated average wheel speed Vxa is the wheel speed at the point of time intermediate between those adjacent zero-crossing points.

In the above case, it is desirable to calculate the average wheel speed Vxa on the basis of the adjacent zero-crossing points which are the last two zero-crossing points immediately prior to the present sampling point. However, the average wheel speed Vxa may be obtained on the basis of last three or more successive zero-crossing points immediately prior to the present sampling point.

The estimated wheel speed Vext at the present sampling point is obtained by extrapolation on the basis of two or more values of the average wheel speed. The simplest way is to calculate the estimated wheel speed Vext according to an appropriate first-order equation, on the basis of the two values of the average wheel speed, which consist of the present value Vxa and the last value VxaL, as in the illustrated embodiment. However, it is possible to calculate the estimated wheel speed Vext according to a first-order or higher-order equation which includes the three or more values of the average wheel speed which include the present value Vxa.

In the illustrated embodiment, the estimated wheel speed Vext at the present sampling point is calculated at the predetermined cycle time CYCT (at the predetermined sampling interval), and the amount of change of the wheel speed during a period equal to a multiple of the cycling time is calculated on the basis of the obtained two or more values of the estimated wheel speed Vext. This arrangement permits calculation of the amount of change of the wheel speed at the predetermined cycle time, and is effective to reduce a delay in the detection of the amount of change of the wheel speed. Since the cycle time for calculating the amount of change of the wheel speed is made equal to the cycle time at which the anti-lock brake pressure control cycle is repeated, each control cycle is implemented with the updated change amount of the wheel speed.

However, the cycle time for calculating or updating the amount of change of the wheel speed need not be equal to the cycle time of the anti-lock brake pressure control.

In the illustrated embodiment, the locking of each wheel is detected when any EDGE signal corresponding to an edge of a tooth or groove of the rotor of the wheel speed sensor is not generated for more than a predetermined length of time. In this case, the estimated wheel speed Vext and the first relative wheel speed change amount $\Delta Vw1$ are reset to zero. However, it is possible that the locking of the wheel is detected when the rear wheel speed difference Vwrdif exceeds a predetermined upper limit. In this case, the reference wheel speed Vsn is raised to eliminate the wheel locking. One of these two alternative arrangements may be used, or both of these alternatives may be employed.

The illustrated embodiment is adapted to obtain the second relative wheel speed change amount $\Delta Vw2$ according to the equation $\Delta Vw2_n = \Delta Vw2_{n-1} \times \frac{7}{8} + \Delta Vw1_n$. In this respect, it is considered that the second relative wheel speed change amount $\Delta Vw2$ upon commencement of a brake pressure decrease increases as the road surface condition deteriorates. Accordingly, it is possible to replace the first and second relative wheel speed change amounts $\Delta Vw1$ and $\Delta Vw2$ with corresponding first and second compensated relative wheel speed change amounts $\Delta Vw1c$ and $\Delta Vw2c$, which are calculated according to the following equations, on the basis of the individual external disturbance value Vn1 obtained from the second relative wheel speed change amount $\Delta Vw2$:

$$\Delta Vw1c = \Delta Vw1 + Vn1/8$$

$$\Delta Vw2c = \Delta Vw2 + Vn1$$

While the illustrated embodiment is adapted to gradually reduce the absolute amount of the estimated overshoot drop amount Vprev of the wheel speed, irrespectively of the current vehicle speed (estimated vehicle speed Vve). This arrangement tends to relatively easily cause locking of the wheel when the vehicle speed is considerably lowered.

To avoid the above drawback, it is effective to increase the rate of reduction of the estimated overshoot drop amount Vprev as the estimated vehicle speed is lowered, or use a relatively high rate of reduction of the value Vprev when the estimated vehicle speed Vve is not higher than a given threshold level, and a relatively low rate of reduction of the value Vprev when the estimated vehicle speed Vve is higher than the threshold level.

The illustrated embodiment is arranged such that the point of time at which an initial brake pressure decrease is commenced is determined on the basis of the present wheel speed Vw, while the points of time at which a subsequent brake pressure decrease or a brake pressure increase is commenced are determined on the basis of the near future wheel speed Vwf. It is possible, however, to use the wheel speed Vw (present wheel speed error Hensa) for the commencement of only an initial brake pressure decrease cycle immediately after the commencement of an anti-lock brake pressure control operation, and use the near future wheel speed Vwf (future wheel speed error Hensaf) for the commencement of the other brake pressure decrease cycles.

In consideration of a tendency of some delay of an actual brake pressure decrease with respect to the moment of generation of a pressure-decrease command, it is also possible to always use the near future wheel speed Vwf for determining the point of time of commencement of any brake pressure decrease cycle.

Described more specifically, the present wheel speed Vw used as a major control parameter is replaced by the near future wheel speed Vwf as the major control parameter, for example, near future wheel speed Vwf20 upon expiration of 20 msec from the present time. In one example, the near future wheel speed Vwf20 is used as the major control parameter, and the present wheel speed Vw and another near future wheel speed Vwf40 (wheel speed 40 msec after the present time) are used as supplemental control parameters, as indicated by the following equations:

$$Tmp = MAX(Vw, Vwf20)$$

$$Vwf = MIN(Tmp, Vw + \Delta V, Vwf40 + \Delta V)$$

The above arrangement causes a brake pressure decrease to be commenced if the present wheel speed Vw or the near future wheel speed Vwf40 has been lowered by a predetermined amount $\Delta V$ or more. For instance, the amount $\Delta V$ may be set at 1 km/hr.

It is also possible that the point of time at which an initial brake pressure decrease is commended is determined by a wheel speed Vwf at a relatively near future point of time, while the point of time at which a subsequent brake pressure decrease or a brake pressure increase is commenced is determined by a wheel speed Vwf at a point of time subsequent to the above-indicated relatively near future point. Further, it is possible that the point of time of commencement of a slow brake pressure increase or decrease or a brake pressure hold is determined by a near future wheel speed Vwf (future wheel speed error Hensaf) which is different from a near future wheel speed Vwf used for determining the point of time of commencement of a rapid brake pressure decrease or increase.

For instance, near future wheel speed error values Hensaf at respective future points 5 msec and 10 msec after the present sampling point, namely, near future wheel speed error values Hensaf05 and Hensaf10 are calculated according to the following equations:

$$Hensaf05 = Hensa + (\Delta Vw1 + Vn1 \times 5 \text{ msec}/40 \text{ msec})$$

$$Hensaf10 = Hensa + (\Delta Vw1 + Vn1 \times 5 \text{ msec}/40 \text{ msec}) \times 2$$

In the illustrated embodiment, a brake pressure increase will follow a brake pressure decrease of a predetermined time duration, unless the future wheel speed error Hensaf has changed to a negative value during the brake pressure decrease cycle. This arrangement eliminates a need of determining the time duration of the brake pressure decrease depending upon the road surface condition and the vehicle running condition, thereby providing an advantage of simplified brake pressure control logics. However, the time duration of the brake pressure decrease may be changed depending upon the road surface and vehicle running conditions.

For instance, it is appreciated to increase the time duration of the brake pressure decrease with a decrease in the absolute value of the amount of change $\Delta Vve$ of the estimated vehicle speed Vve, since the brake pressure and the friction coefficient $\mu$ of the road surface decrease with a decrease in that absolute value $|\Delta Vve|$.

The illustrated embodiment is adapted such that a brake pressure decrease is effected when the present wheel speed error Hensa or future wheel speed error Hensaf is a negative value. This arrangement is not essential. Generally, a brake pressure decrease is effected when the value Hensa or Hensaf becomes smaller than a predetermined threshold.

If the above threshold is a positive value, the brake pressure decrease occurs at a relatively early point of time, and it is therefore desirable that the duration of the brake pressure decrease be relatively short.

In the illustrated embodiment, the determination of a need of commencing a brake pressure decrease is effected on the basis of the reference wheel speed Vsn (=Vve−Ssn), assuming that the reference wheel slip amount Ssn is constant, irrespective of whether the brake pressure decrease occurs during an initial period following the start of an anti-lock brake pressure control operation (ABS operation) or an intermediate period following the initial period. However, the reference wheel slip amount Ssn may be variable. For instance, the reference wheel slip amount Ssn is comparatively large for an initial period of 630 msec after the start of the ABS operation, and is comparatively small for the following period. That is, the reference wheel slip amount Ssn may be reduced in steps as the time passes after the start of the ABS operation. Alternatively, the reference wheel slip amount Ssn may be gradually or continuously reduced as the ABS operation proceeds. Where the reference wheel slip amount Ssn used to determine the reference wheel speed Vsn is variable (reduced in steps or continuously) as indicated above, it is preferred to shorten the time duration of each brake pressure decrease with a decrease in the reference wheel slip amount Ssn.

According to the above modified arrangement, the amount of slip or the amount of change of the wheel speed is reduced during intermediate and terminal periods of the ABS operation, whereby the stability of the brake pressure control is enhanced. Since the past external disturbance values Vn0, Vn1 are stored and subsequently used for calculating the present wheel speed error Hensa, the reference wheel slip amount Ssn should be set at a comparatively large value during the initial period of the ABS operation, but may be reduced after the number of the stored disturbance values Vn0, Vn1 has increased to a considerable value.

For the non-selected higher-speed rear wheel to be able to effectively serve as the speed monitoring wheel, the brake pressure for the higher-speed rear wheel is made lower than that for the selected lower-speed rear wheel. To this end, the duration of a brake pressure decrease for the non-selected higher-speed rear wheel is made longer than a predetermined suitable level or a level determined depending upon the road surface and vehicle running conditions. Conversely, the duration of a brake pressure increase for the higher-speed rear wheel may be shortened. Alternatively, the duration of a brake pressure decrease or increase for the selected lower-speed rear wheel may be suitably adjusted so as to lower the brake pressure for the higher-speed rear wheel with respect to that for the lower-speed rear wheel. Further, the durations of the brake pressure decrease or increase for the two rear wheels may be suitably adjusted.

Thus, the brake pressure for one of the lower-speed and higher-speed rear wheels is controlled to an optimum level, while the brake pressure for the other rear wheel is lower or higher than the optimum level, or alternatively, the brake pressures for the two rear wheels are lower and higher than the optimum level, respectively.

It is to be understood that the present invention may be embodied with various other changes, modifications and improvements, which may occur to those skilled in the art, in the light of the foregoing teachings.

What is claimed is:

1. An apparatus for preventing excessive slipping of a wheel of a motor vehicle, said apparatus comprising:
    pressure regulating means for regulating a brake force for braking the wheel;
    wheel speed obtaining means for obtaining the rotating speed of the wheel;
    vehicle speed obtaining means for obtaining a running speed of the vehicle;
    relative speed change obtaining means for obtaining, as a kind of said amount of change of the rotating speed of the wheel, a relative wheel speed change amount which corresponds to an amount of change of a difference between the speeds of the wheel and the vehicle obtained by said wheel speed obtaining means and said vehicle speed obtaining means, respectively; and
    controlling means for controlling said pressure regulating means in accordance with at least said relative wheel speed change amount.

2. An apparatus according to claim 1, wherein said wheel speed obtaining means includes:
    a wheel speed sensor which generates an output signal whose frequency is proportional to the rotating speed of the wheel; and
    wheel speed calculating means for calculating the rotating speed of the wheel on the basis of said output signal generated by the wheel speed sensor.

3. An apparatus according to claim 2, wherein said wheel speed calculating means includes:
    a pulse signal generating circuit for generating a pulse signal which has alternate rises and falls when a magnitude of said output signal of said wheel speed sensor crosses a predetermined level in opposite directions, respectively;
    an edge signal generating circuit for generating edge signals corresponding to said rises and falls of said pulse signal; and
    average wheel speed calculating means for obtaining a plurality of intermediate points of time each of which is intermediate between moments of generation of adjacent two edge signals corresponding to adjacent rise and fall of said pulse signal, and calculating an average speed of the wheel during a time period between each pair of said intermediate points of time, on the basis of said time period and the number of said edge signals generated during said time period.

4. An apparatus according to claim 3, wherein said wheel speed calculating means further includes extrapolating means for calculating by extrapolation an estimated speed of the wheel at a sampling point following a moment of generation of a last one of said edge signals, on the basis of a plurality of values of said average speed of the wheel obtained by said average wheel speed calculating means.

5. An apparatus according to claim 1, wherein said relative speed change obtaining means includes smoothing means for obtaining a smoothed relative wheel speed change amount by smoothing said relative wheel speed change amount.

6. An apparatus according to claim 5, wherein said smoothing means comprises a digital filter for obtaining said smoothed relative wheel speed change amount by digital smoothing of said relative wheel speed change amount.

7. An apparatus according to claim 6, wherein said digital filter includes:
    a first digital filter for smoothing said relative wheel speed change amount to obtain a first relative wheel speed change amount as said smoothed relative wheel speed change amount; and
    a second digital filter for smoothing said first relative wheel speed change amount to obtain a second relative wheel speed change amount as said smoothed relative wheel speed change amount.

8. An apparatus according to claim 5, wherein said smoothing means comprises:
    a first digital filter for smoothing said relative wheel speed change amount to obtain a non-compressed first relative wheel speed change amount as said smoothed relative wheel speed change amount; and
    compressing means for compressing said non-compressed first relative wheel speed change amount to obtain a compressed first relative wheel speed change amount as said smoothed relative wheel speed change amount, said compressing means including at least one of positive compressing means for reducing an absolute value of said non-compressed first relative wheel speed change amount to obtain said compressed first relative wheel speed change amount when said non-compressed first relative wheel speed change amount is larger than a predetermined positive value, and negative compressing means for reducing the absolute value of said non-compressed first relative wheel speed change amount to obtain said compressed first relative wheel speed change amount when said non-compressed first relative wheel speed change amount is smaller than a predetermined first negative value.

9. An apparatus according to claim 8, wherein said compressing means comprises at least said negative compressing means, and said smoothing means further comprises means for disabling said negative compressing means when said non-compressed first relative wheel speed change amount is smaller than a predetermined second negative value smaller than said first negative value.

10. An apparatus according to claim 8, wherein said smoothing means further comprises a second digital filter for smoothing said compressed first relative wheel speed change amount obtained by said compressing means, to obtain a second relative wheel speed change amount as said smoothed relative wheel speed change amount.

11. An apparatus according to claim 5, wherein said smoothing means comprises at least one of positive compressing means for reducing an absolute value of said relative wheel speed change amount to obtain a compressed relative wheel speed change amount when said relative wheel speed change amount is larger than a predetermined positive value, and negative compressing means for reducing the absolute value of said relative wheel speed change amount to obtain said compressed relative wheel speed change amount when said relative wheel speed change amount is smaller than a predetermined negative value.

12. An apparatus according to claim 1, wherein said motor vehicle has a plurality of wheels, and said vehicle speed obtaining means comprises vehicle speed estimating means for obtaining an estimated vehicle speed on the basis of a highest wheel speed which is a highest one of the rotating speeds of said plurality of wheels.

13. An apparatus according to claim 12, wherein said vehicle speed estimating means includes means for limiting at least one of an increasing rate and a decreasing rate of said highest wheel speed.

14. An apparatus according to claim 12, wherein said vehicle speed estimating means includes at least one of: first adjusting means for reducing said highest wheel speed with an increase in an external disturbance value which is common to all of said plurality of wheels; second adjusting means for increasing said highest wheel speed with a decrease in a friction coefficient of a road surface on which the vehicle is running; and third adjusting means for reducing said highest wheel speed with an increase in a degree of turning of said vehicle.

15. An apparatus according to claim 14, wherein said vehicle speed estimating means includes smoothing means for smoothing said highest wheel speed as adjusted by at least one of said first, second and third adjusting means, to obtain said estimated vehicle speed.

16. An apparatus according to claim 15, wherein said smoothing means includes first integrating means for obtaining a first integral by integrating an error between said estimated vehicle speed and said highest wheel speed as adjusted by at least one of said first, second and third adjusting means, and second integrating means for obtaining a final estimated vehicle speed by integrating said first integral.

17. An apparatus according to claim 15, wherein said controlling means comprises anti-lock control means for controlling said pressure regulating means to regulate the brake force for braking said wheel so as to prevent excessive slipping of said wheel on a road surface upon braking of said vehicle, and wherein said vehicle speed estimating means includes said second adjusting means, said smoothing means comprising means for setting an amount of change of said estimated vehicle speed upon commencement of an operation of said anti-lock control means, to a value corresponding to a friction coefficient of said road surface which is higher than 0.6.

18. An apparatus according to claim 15, wherein said smoothing means comprises means for smoothing said highest wheel speed to obtain said estimated vehicle speed such that said estimated vehicle is more responsive to said highest wheel speed when said friction coefficient of the road surface decreases, than when said friction coefficient increases.

19. An apparatus according to claim 15, wherein said smoothing means comprises response adjusting means for causing an easier change of said estimated vehicle speed in at least one of first and second cases where said friction coefficient of the road surface is higher and lower than respective upper and lower limits, respectively, than in cases other than said first and second cases.

20. An apparatus according to claim 15, wherein said smoothing means comprises response adjusting means for causing an easier change of said estimated vehicle speed in at least one of first and second cases where an error between said estimated vehicle speed and said highest wheel speed as adjusted by at least one of said first, second and third adjusting means is held positive and negative for more than a first and a second predetermined time, respectively, than in cases other than said first and second cases.

21. An apparatus according to claim 7, wherein said motor vehicle has a plurality of wheels whose brake pressures are regulated by said pressure regulating means, and said vehicle speed obtaining means comprises vehicle speed estimating means for obtaining an estimated vehicle speed on the basis of a highest wheel speed which is a highest one of the rotating speed of said plurality of wheels, and wherein said vehicle speed estimating means includes at least one of: first adjusting means for reducing said highest wheel speed with an increase in an external disturbance value which is common to all of said plurality of wheels; second adjusting means for increasing said highest wheel speed with a decrease in a friction coefficient of a road surface on which the vehicle is running; and third adjusting means for reducing said highest wheel speed with an increase in a degree of turning of said vehicle.

22. An apparatus according to claim 21, wherein said first adjusting means comprises common disturbance obtaining means for obtaining said external disturbance value on the basis of an absolute value of a smallest negative value of said second relative wheel speed change amounts of the wheels whose brake pressures are increasing.

23. An apparatus according to claim 22, wherein said first adjusting means further comprises means for disabling said common disturbance obtaining means for a predetermined time duration after commencement of operation of said pressure regulating means to regulate said brake pressures for the wheels.

24. An apparatus according to claim 22, wherein said common disturbance obtaining means comprises means for limiting a decreasing rate of said external disturbance value while the absolute value of said smallest negative value is decreasing.

25. An apparatus according to claim 21, wherein said plurality of wheels include a rear right wheel and a rear left wheel, and said second adjusting means comprises:
  pressure-difference generating means for generating a pressure difference between a first rear brake pressure for one of said rear right and left wheels whose rotating speed is higher than the other rear wheel, and a second rear brake pressure for said other rear wheel, such that said first rear brake pressure is lower than said second rear brake pressure; and
  means for increasing said highest wheel speed with an increase in a rear wheel speed difference between the rotating speeds of said rear right and left wheels.

26. An apparatus according to claim 21, wherein said plurality of wheels include a front right wheel and a front left wheel, and said third adjusting means comprises means for reducing said highest wheel speed with an increase in a front wheel speed difference between the rotating speeds of said front right and left wheels.

27. An apparatus according to claim 1, wherein said wheel speed obtaining means comprises:
  vehicle speed change calculating means for calculating an estimated vehicle speed change amount which is a difference between two values of the running speed of the vehicle; and
  means for calculating a present value of the rotating speed of the wheel, by adding said estimated vehicle speed change amount and said relative wheel speed change amount obtained by said relative speed change obtaining means, to a last value of the rotating speed of the wheel.

28. An apparatus according to claim 27, wherein said pressure regulating means comprises:
  generating means for generating a reference speed of the wheel on the basis of the running speed of the vehicle obtained by said vehicle speed obtaining means; and
  commanding means for generating a control command for regulating said brake force, on the basis of a difference between said present value of the rotating speed of the wheel and said reference speed of the wheel.

29. An apparatus according to claim 1, wherein said controlling means comprises anti-lock control means for controlling said pressure regulating means to regulate the brake force for braking said wheel so as to prevent excessive slipping of said wheel on a road surface upon braking of said vehicle.

* * * * *